(12) United States Patent
Jang et al.

(10) Patent No.: US 11,770,537 B2
(45) Date of Patent: Sep. 26, 2023

(54) IMAGE ENCODING/DECODING METHOD AND APPARATUS FOR PERFORMING INTRA PREDICTION, AND METHOD FOR TRANSMITTING BITSTREAM

(71) Applicant: LG Electronics Inc., Seoul (KR)

(72) Inventors: Hyeong Moon Jang, Seoul (KR); Jin Heo, Seoul (KR); Jung Hak Nam, Seoul (KR); Jangwon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/474,919

(22) Filed: Sep. 14, 2021

(65) Prior Publication Data

US 2022/0279189 A1 Sep. 1, 2022

Related U.S. Application Data

(63) Continuation of application No. PCT/KR2020/003562, filed on Mar. 13, 2020.

(Continued)

(51) Int. Cl.
*H04N 19/136* (2014.01)
*H04N 19/159* (2014.01)
(Continued)

(52) U.S. Cl.
CPC ......... *H04N 19/136* (2014.11); *H04N 19/159* (2014.11); *H04N 19/176* (2014.11); *H04N 19/186* (2014.11); *H04N 19/96* (2014.11)

(58) Field of Classification Search
None
See application file for complete search history.

(56) References Cited

U.S. PATENT DOCUMENTS

2014/0098862 A1* 4/2014 Yang ............... H04N 19/463
375/240.12
2015/0063438 A1* 3/2015 Kim ............... H04N 19/11
375/240.02

(Continued)

FOREIGN PATENT DOCUMENTS

EP 3422717 1/2019
KR 20180033302 4/2018

(Continued)

OTHER PUBLICATIONS

Choi et al., "CE3-related : Reduced number of reference samples for CCLM parameter calculation," JVET-L0138-v1, Presented at Joint Video Experts Team (JVET) of ITU-T SG 16 WP 3 and ISO/IEC JTC 1/SC 29/WG 11, 12th Meeting: Macao, CN, Oct. 3-12, 2018, 5 pages.

(Continued)

*Primary Examiner* — Mohammad J Rahman
(74) *Attorney, Agent, or Firm* — Fish & Richardson P.C

(57) ABSTRACT

An image encoding/decoding method and apparatus are provided. An image decoding method according to the present disclosure comprises determining whether to apply intra prediction to a current chroma block based on information on prediction of the current chroma block, deriving an intra prediction mode of the current chroma block based on an intra prediction mode of a corresponding luma block corresponding to the current chroma block and intra chroma prediction mode information of the current chroma block, when intra prediction applies to the current chroma block, and generating a prediction block of the current chroma block, by performing intra prediction based on the intra prediction mode of the current chroma block. When the intra prediction mode of the corresponding luma block is not (Continued)

present, the intra prediction mode of the current chroma block is derived based on a default intra prediction mode.

9 Claims, 18 Drawing Sheets

Related U.S. Application Data

(60) Provisional application No. 62/818,730, filed on Mar. 14, 2019.

(51) Int. Cl.
    *H04N 19/186* (2014.01)
    *H04N 19/176* (2014.01)
    *H04N 19/96* (2014.01)

(56) References Cited

U.S. PATENT DOCUMENTS

| | | | |
|---|---|---|---|
| 2017/0105025 A1 | 4/2017 | Jeon et al. | |
| 2018/0205946 A1 | 7/2018 | Zhang et al. | |
| 2019/0246128 A1* | 8/2019 | Xu | H04N 19/186 |
| 2019/0281321 A1* | 9/2019 | Zhao | H04N 19/61 |
| 2019/0387222 A1* | 12/2019 | Kim | H04N 19/593 |
| 2020/0045322 A1* | 2/2020 | Ye | H04N 19/593 |
| 2020/0260096 A1* | 8/2020 | Ikai | H04N 19/96 |
| 2020/0382798 A1* | 12/2020 | Xu | H04N 19/147 |
| 2021/0136365 A1* | 5/2021 | Kim | H04N 19/11 |

FOREIGN PATENT DOCUMENTS

| | | |
|---|---|---|
| KR | 20180122361 | 11/2018 |
| RU | 2604669 | 12/2016 |
| RU | 2612386 | 3/2017 |
| WO | WO2018062921 | 4/2018 |
| WO | WO2018064956 | 4/2018 |

OTHER PUBLICATIONS

Office Action in Russian Appln. No. 2021129713, dated Mar. 4, 2022, 18 pages (with English translation).

Xu et al., "Intra block copy for next generation video coding," 2018 IEEE International Conference on Multimedia & Expo Workshops, Jul. 2018, 4 pages.

Zhang et al., "Enhanced Cross-component Linear Model Intra-prediction," JVET-D0110, Presented at Joint Video Exploration Team (JVET) of ITU-T SG 16 WP 3 and ISO/IEC JTC 1/SC 29/WG 11, 4th Meeting: Chengdu, CN, Oct. 15-21, 2016, 6 pages.

Office Action in Russian Appln. No. 2021129713, dated Jun. 29, 2022, 9 pages (with English translation).

Shutkin, "Terms and definitions of ISO/IEC 2382-1," ISO 2382-1:1993, Presented at ISO/IEC JTC1/SC1/WG4 held in Stockholm in May 1998, 10 pages.

Extended European Search Report in European Appln. No. 20770673.0, dated Nov. 22, 2022, 10 pages.

Rath et al., "CE3-related: OM-dependent chroma intra prediction modes," JVET-M0100, Presented at Joint Video Experts Team (JVET) of ITU-T SG 16 WP 3 and ISO/TEC JTC 1/SC 29/WG 11, 13th Meeting: Marrakech, MA, Jan. 9-18, 2019, 5 pages.

* cited by examiner

SPLIT_BT_VER   SPLIT_BT_HOR   SPLIT_TT_VER   SPLIT_TT_HOR luma block　　　　　chroma block

IMAGE ENCODING/DECODING METHOD AND APPARATUS FOR PERFORMING INTRA PREDICTION, AND METHOD FOR TRANSMITTING BITSTREAM

CROSS-REFERENCE TO RELATED APPLICATIONS

Pursuant to 35 U.S.C. § 119(e), this application is a continuation of International Application PCT/KR2020/003562, with an international filing date of Mar. 13, 2020, which claims the benefit of U.S. Provisional Patent Application No. 62/818,730, filed on Mar. 14, 2019, the contents of which are hereby incorporated by reference herein in their entirety.

TECHNICAL FIELD

The present disclosure relates to an image encoding/decoding method and apparatus, and, more particularly, to a method and apparatus for encoding/decoding an image using intra prediction, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide a method and apparatus for encoding/decoding an image using intra prediction.

Another object of the present disclosure is to provide an image encoding/decoding method and apparatus for performing intra prediction with respect to a chroma block after an intra prediction mode of the chroma block is derived based on an intra prediction mode of a corresponding luma block or a default intra prediction mode.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise determining whether to apply intra prediction to a current chroma block based on information on prediction of the current chroma block, deriving an intra prediction mode of the current chroma block based on an intra prediction mode of a corresponding luma block corresponding to the current chroma block and intra chroma prediction mode information of the current chroma block, when intra prediction applies to the current chroma block, and generating a prediction block of the current chroma block, by performing intra prediction based on the intra prediction mode of the current chroma block. When the intra prediction mode of the corresponding luma block is not present, the intra prediction mode of the current chroma block may be derived based on a default intra prediction mode.

In the image decoding method according to the present disclosure, the deriving the intra prediction mode of the current chroma block may comprise determining a prediction method at a predetermined position of the corresponding luma block.

In the image decoding method according to the present disclosure, when the prediction method at the predetermined position of the corresponding luma block is intra prediction, the intra prediction mode of the current chroma block may be derived based on an intra prediction mode at a predetermined position of the corresponding luma block, and, when the prediction method at the predetermined position of the corresponding luma block is not intra prediction, the intra prediction mode of the current chroma block may be derived based on the default intra prediction mode.

In the image decoding method according to the present disclosure, when the prediction method at the predetermined position of the corresponding luma block is intra block copy (IBC) prediction, the intra prediction mode of the current chroma block may be derived based on the default intra prediction mode.

In the image decoding method according to the present disclosure, the predetermined position may be a center position of the corresponding luma block.

In the image decoding method according to the present disclosure, the default intra prediction mode may be a planar mode or a DC mode.

In the image decoding method according to the present disclosure, a tree structure of the current chroma block may be a dual tree (DUAL_TREE) structure.

In the image decoding method according to the present disclosure, when the intra prediction mode information of the current chroma block indicates a direct mode (DM) and the intra prediction mode of the corresponding luma block is present, the intra prediction mode of the current chroma block may be derived as the intra prediction mode of the corresponding luma block, and, when the intra prediction mode information of the current chroma block indicates a DM and the intra prediction mode of the corresponding luma block is not present, the intra prediction mode of the current chroma block may be derived as the default intra prediction mode.

An image decoding apparatus according to another aspect of the present disclosure comprises a memory, and at least one processor. The at least one processor may determine whether to apply intra prediction to a current chroma block based on information on prediction of the current chroma block, derive an intra prediction mode of the current chroma block based on an intra prediction mode of a corresponding luma block corresponding to the current chroma block and intra chroma prediction mode information of the current chroma block, when intra prediction applies to the current chroma block, and generate a prediction block of the current chroma block, by performing intra prediction based on the intra prediction mode of the current chroma block. When the intra prediction mode of the corresponding luma block is not present, the intra prediction mode of the current chroma block may be derived based on a default intra prediction mode.

An image encoding method according to another aspect of the present disclosure comprises determining whether to apply intra prediction to a current chroma block, deriving an intra prediction mode of the current chroma block based on an intra prediction mode of a corresponding luma block corresponding to the current chroma block, when intra prediction applies to the current chroma block, generating a prediction block of the current chroma block, by performing intra prediction based on the intra prediction mode of the current chroma block, and encoding the intra prediction mode of the current chroma block based on the intra prediction mode of the corresponding luma block. When the intra prediction mode of the corresponding luma block is not present, the intra prediction mode of the current chroma block may be derived based on a default intra prediction mode.

In the image encoding method according to the present disclosure, the deriving the intra prediction mode of the current chroma block may comprise determining a prediction method at a predetermined position of the corresponding luma block.

In the image encoding method according to the present disclosure, when the prediction method at the predetermined position of the corresponding luma block is intra prediction, the intra prediction mode of the current chroma block may be derived based on an intra prediction mode at a predetermined position of the corresponding luma block, and, when the prediction method at the predetermined position of the corresponding luma block is not intra prediction, the intra prediction mode of the current chroma block may be derived based on the default intra prediction mode.

In the image encoding method according to the present disclosure, the predetermined position may be a center position of the corresponding luma block.

In the image encoding method according to the present disclosure, the default intra prediction mode may be a planar mode or a DC mode.

In addition, a transmission method according to another aspect of the present disclosure may transmit the bitstream generated by the image encoding apparatus or the image encoding method of the present disclosure.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, an image encoding/decoding method and apparatus with improved encoding/decoding efficiency may be provided.

According to the present disclosure, a method and apparatus for encoding/decoding an image using intra prediction may be provided.

According to the present disclosure, an image encoding/decoding method and apparatus for performing intra prediction with respect to a chroma block after an intra prediction mode of the chroma block is derived based on an intra prediction mode of a corresponding luma block or a default intra prediction mode may be provided.

Also, according to the present disclosure, a method of transmitting a bitstream generated by an image encoding method or apparatus according to the present disclosure may be provided.

Also, according to the present disclosure, a recording medium storing a bitstream generated by an image encoding method or apparatus according to the present disclosure may be provided.

Also, according to the present disclosure, a recording medium storing a bitstream received, decoded and used to reconstruct an image by an image decoding apparatus according to the present disclosure may be provided.

It will be appreciated by persons skilled in the art that that the effects that can be achieved through the present disclosure are not limited to what has been particularly described hereinabove and other advantages of the present disclosure will be more clearly understood from the detailed description.

MODE FOR INVENTION

Figure 1:
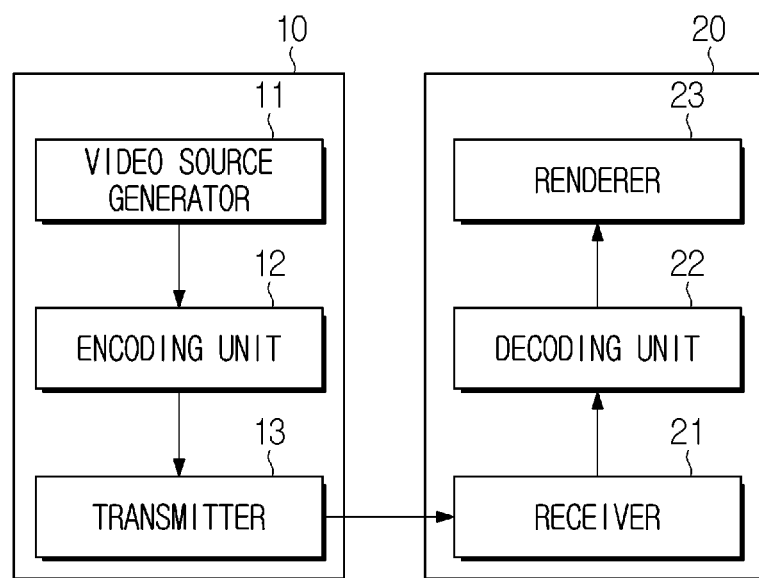
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
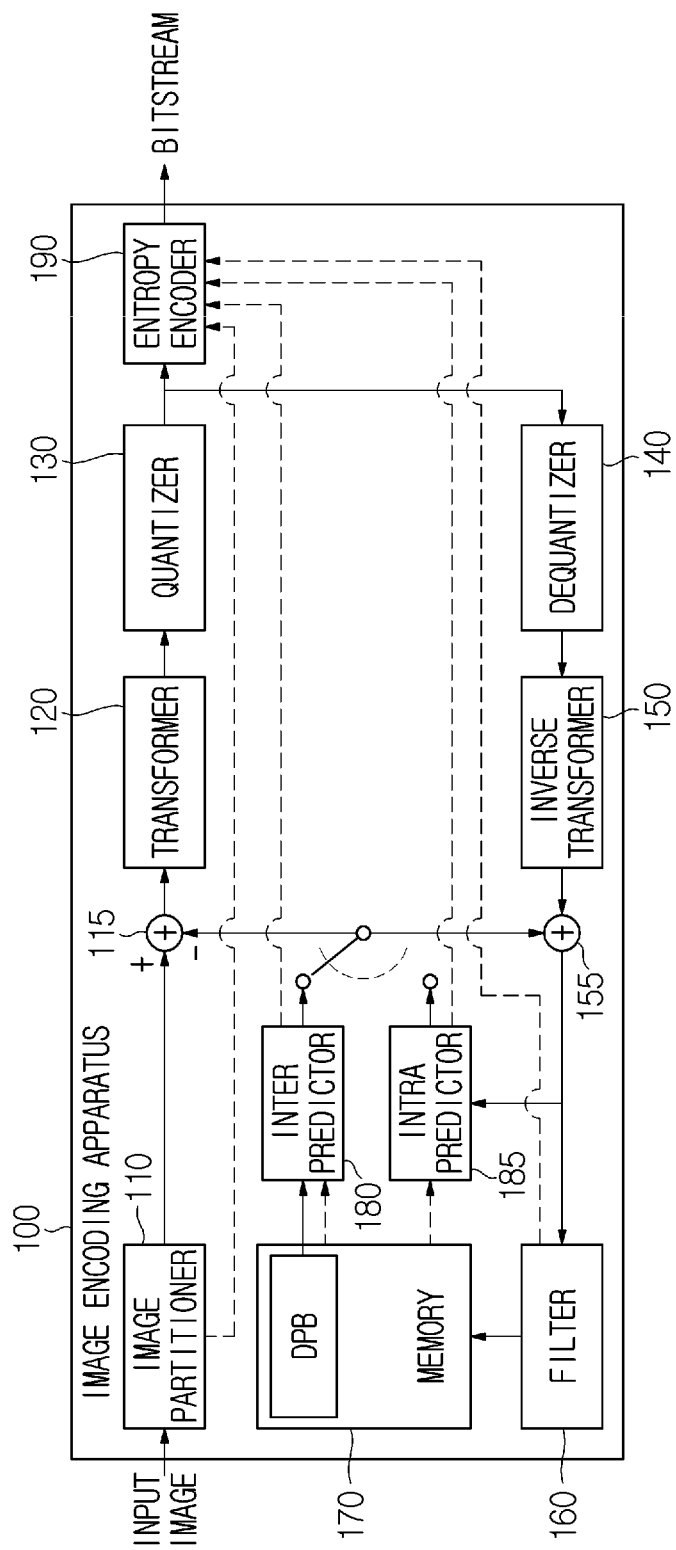
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
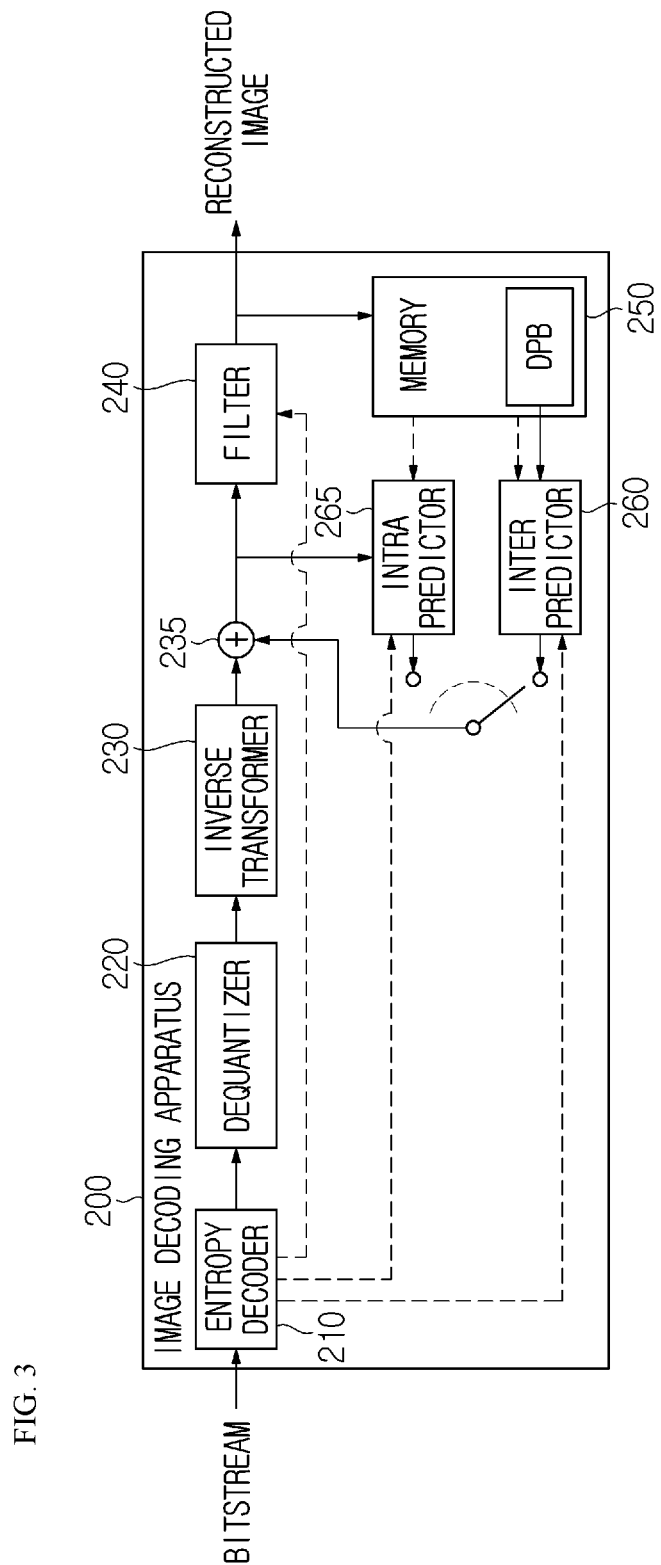
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned by quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned by the quadtree structure, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Figure 4:
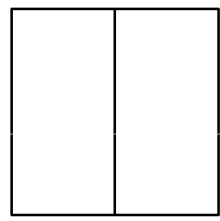
FIG. 4 is a view showing a partitioning type of a block according to a multi-type tree structure.
Figure 4:
Figure 4:
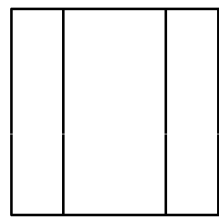
Figure 4:
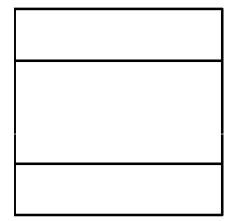

FIG. 4 is a view showing an embodiment of a partitioning type of a block according to a multi-type tree structure. Partitioning according to the multi-type tree structure may include two types of splitting according to a binary tree structure and two types of splitting according to a ternary tree structure.

The two types of splitting according to the binary tree structure may include vertical binary splitting (SPLIT_BT_VER) and horizontal binary splitting (SPLIT_BT_HOR). Vertical binary splitting (SPLIT_BT_VER) means that the current CU is split into equally two in the vertical direction. As shown in FIG. 4, by vertical binary splitting, two CUs having the same height as the current CU and having a width which is half the width of the current CU may be generated. Horizontal binary splitting (SPLIT_BT_HOR) means that the current CU is split into equally two in the horizontal direction. As shown in FIG. 4, by horizontal binary splitting, two CUs having a height which is half the height of the current CU and having the same width as the current CU may be generated.

Two types of splitting according to the ternary tree structure may include vertical ternary splitting (SPLIT_TT_VER) and horizontal ternary splitting (SPLIT_TT_HOR). In vertical ternary splitting (SPLIT_TT_VER), the current CU is split in the vertical direction at a ratio of 1:2:1. As shown in FIG. 4, by vertical ternary splitting, two CUs having the same height as the current CU and having a width which is ¼ of the width of the current CU and a CU having the same height as the current CU and having a width which is half the width of the current CU may be generated. In horizontal ternary splitting (SPLIT_TT_HOR), the current CU is split in the horizontal direction at a ratio of 1:2:1. As shown in FIG. 4, by horizontal ternary splitting, two CUs having a height which is ¼ of the height of the current CU and having the same width as the current CU and a CU having a height which is half the height of the current CU and having the same width as the current CU may be generated.

Figure 5:
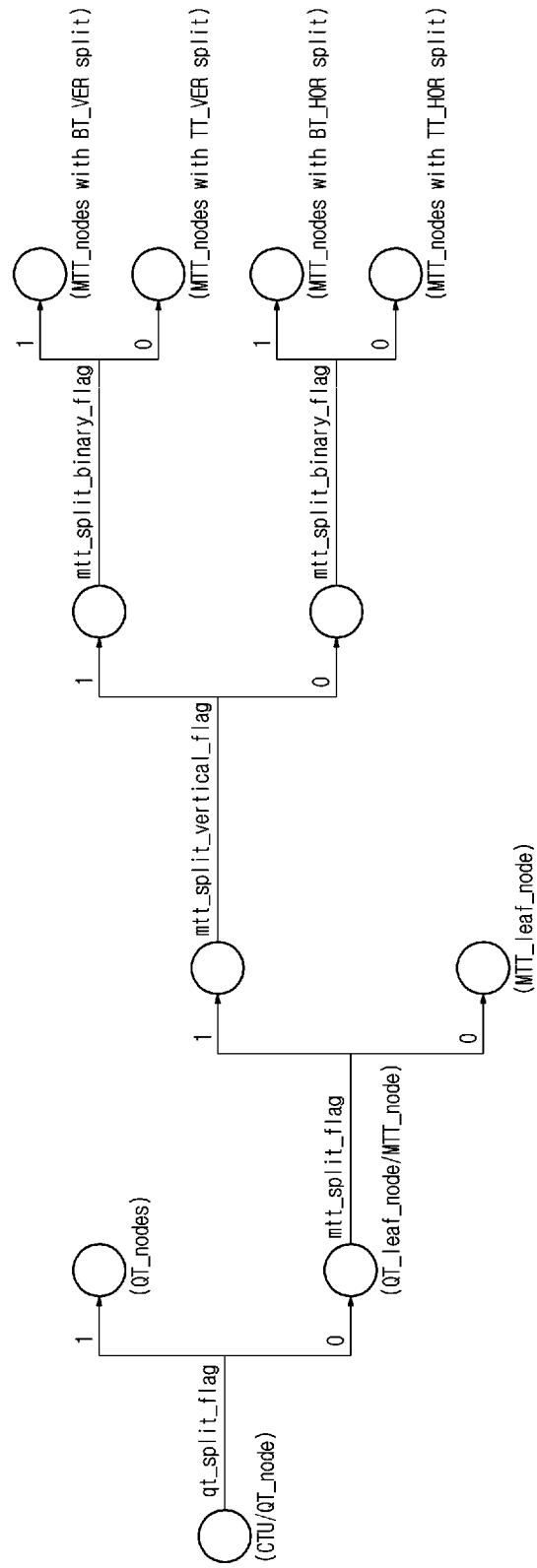
FIG. 5 is a view showing a signaling mechanism of partition splitting information in a quadtree with nested multi-type tree structure according to the present disclosure.

FIG. 5 is a view showing a signaling mechanism of partition splitting information in a quadtree with nested multi-type tree structure according to the present disclosure.

Here, the CTU is treated as the root node of the quadtree, and is partitioned for the first time by a quadtree structure. Information (e.g., qt_split_flag) indicating whether quadtree splitting is performed with respect to the current CU (CTU or node (QT_node) of the quadtree) may be signaled. For example, when qt_split_flag has a first value (e.g., "1"), the current CU may be quadtree-partitioned. In addition, when qt_split_flag has a second value (e.g., "0"), the current CU is not quadtree-partitioned, but becomes the leaf node (QT_leaf_node) of the quadtree. Each quadtree leaf node may then be further partitioned into multitype tree structures. That is, the leaf node of the quadtree may become the node (MTT_node) of the multi-type tree. In the multitype tree structure, a first flag (e.g., mtt_split_cu_flag) is signaled to indicate whether the current node is additionally partitioned. If the corresponding node is additionally partitioned (e.g., if the first flag is 1), a second flag (e.g., mtt_split_cu_vertical_flag) may be signaled to indicate the splitting direction. For example, the splitting direction may be a vertical direction if the second flag is 1 and may be a horizontal direction if the second flag is 0. Then, a third flag (e.g., mtt_split_cu_binary_flag) may be signaled to indicate whether the split type is a binary split type or a ternary split type. For example, the split type may be a binary split type when the third flag is 1 and may be a ternary split type when the third flag is 0. The node of the multi-type tree acquired by binary splitting or ternary splitting may be further partitioned by multi-type tree structures. However, the node of the multi-type tree may not be partitioned by quadtree structures. If the first flag is 0, the corresponding node of the multi-type tree is no longer split but becomes the leaf node (MTT_leaf_node) of the multi-type tree. The CU corresponding to the leaf node of the multi-type tree may be used as the above-described final coding unit.

Based on the mtt_split_cu_vertical_flag and the mtt_split_cu_binary_flag, a multi-type tree splitting mode (MttSplitMode) of a CU may be derived as shown in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

One CTU may include a coding block of luma samples (hereinafter referred to as a "luma block") and two coding blocks of chroma samples corresponding thereto (hereinafter referred to as "chroma blocks"). The above-described coding tree scheme may be equally or separately applied to the luma block and chroma block of the current CU. Specifically, the luma and chroma blocks in one CTU may be partitioned into the same block tree structure and, in this case, the tree structure may be represented as SINGLE_TREE. Alternatively, the luma and chroma blocks in one CTU may be partitioned into separate block tree structures, and, in this case, the tree structure may be represented as DUAL_TREE. That is, when the CTU is partitioned into dual trees, the block tree structure for the luma block and the block tree structure for the chroma block may be separately present. In this case, the block tree structure for the luma block may be called DUAL_TREE_LUMA, and the block tree structure for the chroma component may be called DUAL_TREE_CHROMA. For P and B slice/tile groups, luma and chroma blocks in one CTU may be limited to have the same coding tree structure. However, for I slice/tile groups, luma and chroma blocks may have a separate block tree structure from each other. If the separate block tree structure is applied, the luma CTB may be partitioned into CUs based on a particular coding tree structure, and the chroma CTB may be partitioned into chroma CUs based on another coding tree structure. That is, a CU in an I slice/tile group, to which the individual block tree structure applies, may include a coding block of luma components or coding blocks of two chroma components. In addition, a CU in an I slice/tile group, to which the same block tree structure applies, and a CU of a P or B slice/tile group may include blocks of three color components (a luma component and two chroma components). Although a quadtree coding tree structure with a nested multitype tree has been described, a structure in which a CU is partitioned is not limited thereto. For example, the BT structure and the TT structure may be interpreted as a concept included in a multiple partitioning tree (MPT) structure, and the CU may be interpreted as being partitioned through the QT structure and the MPT structure. In an example where the CU is partitioned through a QT structure and an MPT structure, a syntax element (e.g., MPT_split_type) including information on how many blocks the leaf node of the QT structure is partitioned into and a syntax element (ex. MPT_split_mode) including information on which of vertical and horizontal directions the leaf node of the QT structure is partitioned into may be signaled to determine a partitioning structure.

In another example, a CU may be partitioned in a way different from a QT structure, a BT structure or a TT structure. That is, unlike partitioning a CU of a lower depth into a size of ¼ of a CU of a higher depth according to the QT size, partitioning a CU of a lower depth into a size of ½ of a CU of a higher depth according to the BT size or partitioning a CU of a lower depth into a size of ¼ or ½ of a CU of a higher depth according to the TT size, the CU of the lower depth may be partitioned into a size of ⅕, ⅓, ⅜, ⅗, ⅔ or ⅝ of a CU of a higher depth, and a method of partitioning a CU is not limited thereto.

Overview of Intra Prediction

Hereinafter, intra prediction according to an embodiment will be described.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction. When MRL does not apply, reference samples may be derived from a reference sample line directly adjacent to the current block. In this case, information on the reference sample line may not be signaled.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance. Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL, ISP or MIP. A general intra prediction method excluding a specific intra prediction type such as LIP, LM, PDPC, MRL or ISP may be referred to as a normal intra prediction type. The normal intra prediction type is generally applicable when the above-described specific intra prediction type does not apply, and prediction may be performed based on the above-described intra prediction mode. Meanwhile, if necessary, post-filtering may be performed with respect to the derived prediction sample.

Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Figure 6:
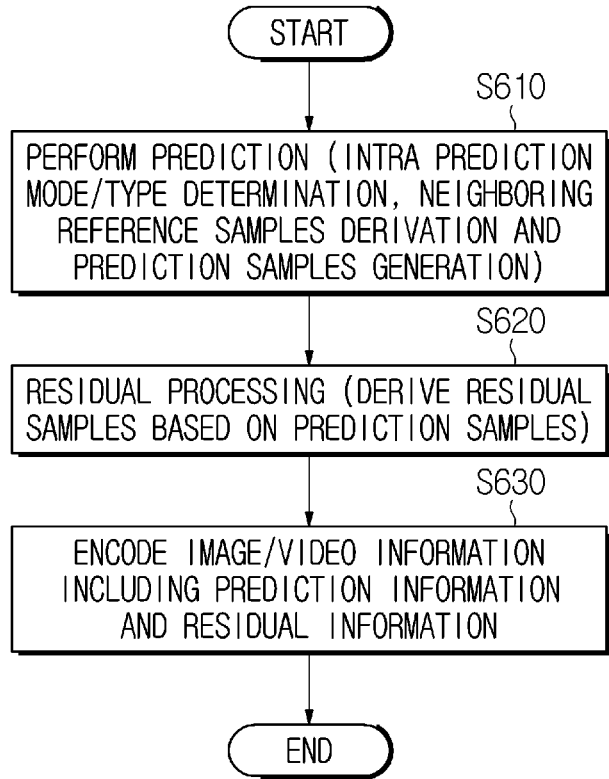
FIG. 6 is a flowchart illustrating an intra prediction based video/image encoding method.

FIG. 6 is a flowchart illustrating an intra prediction based video/image encoding method.

The encoding method of FIG. 6 may be performed by the image encoding apparatus of FIG. 2. Specifically, step S610 may be performed by the intra prediction unit 185, and step S620 may be performed by the residual processor. Specifically, step S620 may be performed by the subtractor 115. Step S630 may be performed by the entropy encoder 190. The prediction information of step S630 may be derived by the intra prediction unit 185, and the residual information of step S630 may be derived by the residual processor. The residual information is information on the residual samples. The residual information may include information on quantized transform coefficient for the residual samples. As described above, the residual samples may be derived as transform coefficient through the transformer 120 of the image encoding apparatus, and the transform coefficient may be derived as the transform coefficients quantized through the quantizer 130. The information on the quantized transform coefficients may be encoded by the entropy encoder 190 through a residual coding procedure.

The image encoding apparatus may perform intra prediction with respect to a current block (S610). The image encoding apparatus may determine an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures.

Figure 7:
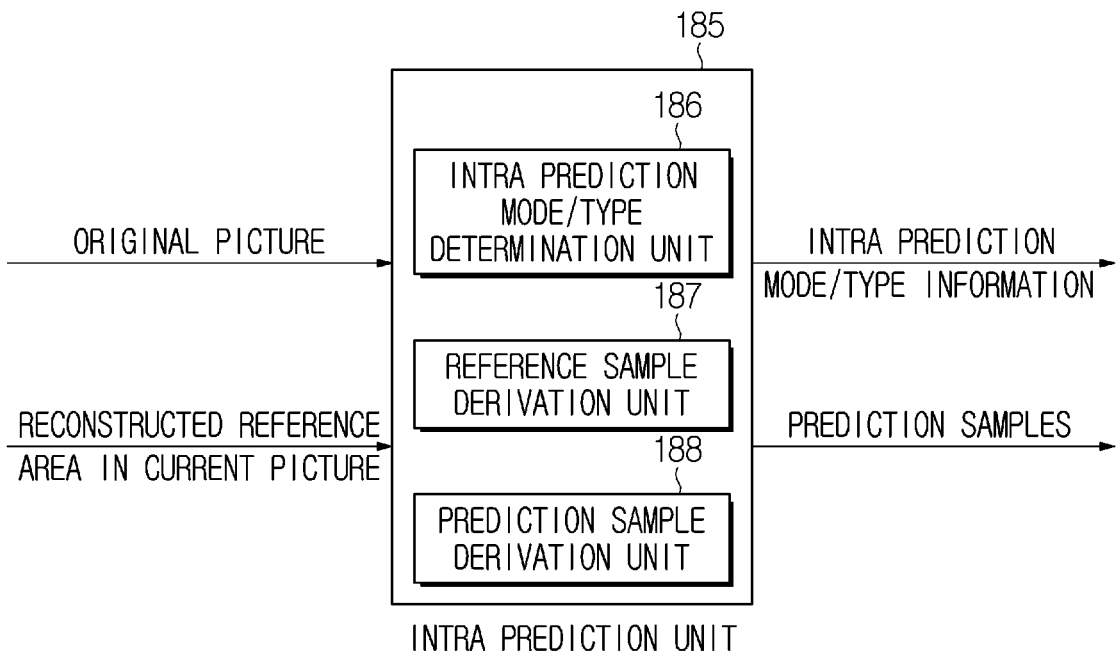
FIG. 7 is a view showing the configuration of the intra prediction unit 185 according to the present disclosure.

FIG. 7 is a view illustrating the configuration of an intra prediction unit 185 according to the present disclosure.

As shown in FIG. 7, the intra prediction unit 185 of the image encoding apparatus may include an intra prediction mode/type determination unit 186, a reference sample derivation unit 187 and/or a prediction sample derivation unit 188. The intra prediction mode/type determination unit 186 may determine an intra prediction mode/type for the current block. The reference sample derivation unit 187 may derive neighboring reference samples of the current block. The prediction sample derivation unit 188 may derive prediction samples of the current block. Meanwhile, although not shown, when the below-described prediction sample filtering procedure is performed, the intra prediction unit 185 may further include a prediction sample filter (not shown).

The image encoding apparatus may determine a mode/type applying to the current block among a plurality of intra prediction modes/types. The image encoding apparatus may compare rate distortion (RD) cost for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Referring to FIG. 6 again, the image encoding apparatus may generate residual samples for the current block based on the prediction samples or the filtered prediction samples (S620). The image encoding apparatus may derive the residual samples by subtracting the prediction samples from the original samples of the current block. That is, the image encoding apparatus may derive the residual sample values by subtracting the corresponding prediction sample value from the original sample value.

The image encoding apparatus may encode image information including information on the intra prediction (prediction information) and residual information of the residual samples (S630). The prediction information may include the intra prediction mode information and/or the intra prediction technique information. The image encoding apparatus may output the encoded image information in the form of a bitstream. The output bitstream may be transmitted to the image decoding apparatus through a storage medium or a network.

The residual information may include residual coding syntax, which will be described later. The image encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and a reconstructed block). To this end, the image encoding apparatus may perform dequantization/inverse transform with respect to the quantized transform coefficients and derive (modified) residual samples. The reason for transforming/quantizing the residual samples and then performing dequantization/inverse transform is to derive the same residual samples as residual samples derived by the image decoding apparatus. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is further applicable to the reconstructed picture.

Figure 8:
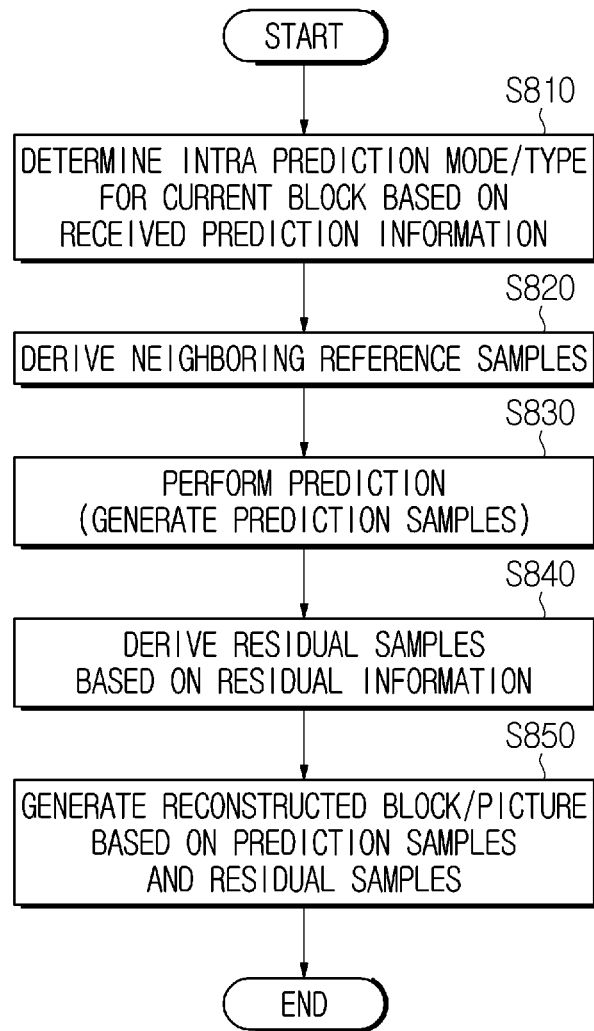
FIG. 8 is a flowchart illustrating an intra prediction based video/image decoding method.

FIG. 8 is a flowchart illustrating an intra prediction based video/image decoding method.

The image decoding apparatus may perform operation corresponding to operation performed by the image encoding apparatus.

The decoding method of FIG. 8 may be performed by the image decoding apparatus of FIG. 3. Steps S810 to S830 may be performed by the intra prediction unit 265, and the prediction information of step S810 and the residual information of step S840 may be obtained from a bitstream by the entropy decoder 210. The residual processor of the image decoding apparatus may derive residual samples for the current block based on the residual information (S840). Specifically, the dequantizer 220 of the residual processor may perform dequantization based on the dequantized transform coefficients derived based on the residual information to derive transform coefficients, and the inverse transformer 230 of the residual processor may perform inverse transform with respect to the transform coefficients to derive the residual samples for the current block. Step S850 may be performed by the adder 235 or the reconstructor.

Specifically, the image decoding apparatus may derive an intra prediction mode/type for the current block based on the received prediction information (intra prediction mode/type information) (S810). The image decoding apparatus may derive neighboring reference samples of the current block (S820). The image decoding apparatus may generate prediction samples in the current block based on the intra prediction mode/type and the neighboring reference samples (S830). In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information (S840). The image decoding apparatus may generate reconstructed samples for the current block based on the prediction samples and the residual samples and derive a reconstructed block including the reconstructed samples (S850). Based on the reconstructed block, the reconstructed picture for the current picture may be generated. An in-loop filtering procedure is further applicable to the reconstructed picture, as described above.

Figure 9:
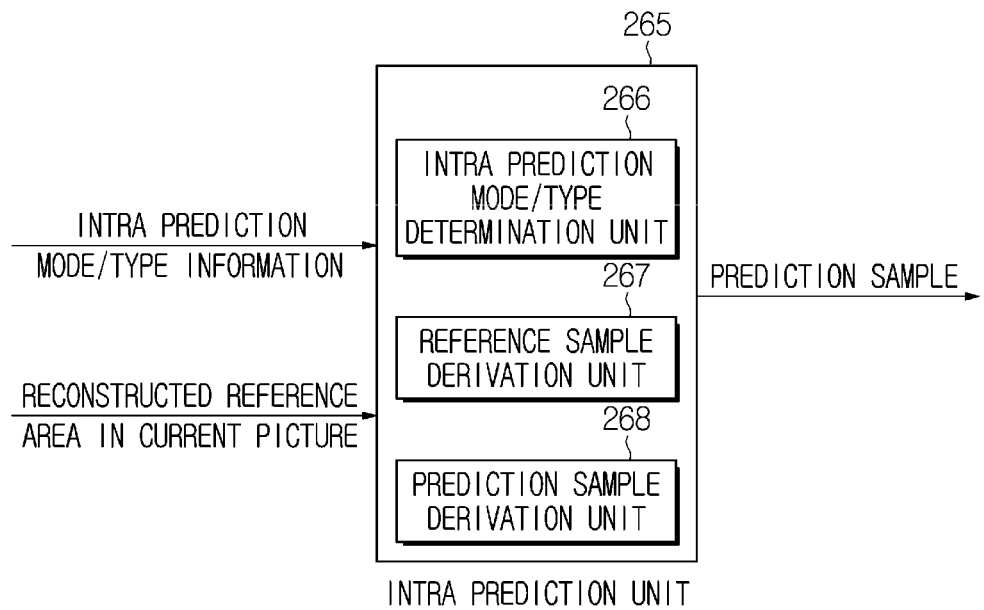
FIG. 9 is a view showing the configuration of the intra prediction unit 265 according to the present disclosure.

FIG. 9 is a view illustrating the configuration of an intra prediction unit 265 according to the present disclosure.

As shown in FIG. 9, the intra prediction unit 265 of the image decoding apparatus may include an intra prediction mode/type determination unit 266, a reference sample derivation unit 267 and a prediction sample derivation unit 268. The intra prediction mode/type determination unit 266 may determine an intra prediction mode/type for the current block based on the intra prediction mode/type information generated and signaled by the intra prediction mode/type determination unit 186 of the image encoding apparatus, and the reference sample derivation unit 267 may derive neighboring reference samples of the current block from a reconstructed reference region in a current picture. The prediction sample derivation unit 268 may derive prediction samples of the current block. Meanwhile, although not shown, when the above-described prediction sample filtering procedure is performed, the intra prediction unit 265 may further include a prediction sample filter (not shown).

The intra prediction mode information may include, for example, flag information (e.g., intra_luma_mpm_flag) indicating whether to apply a most probable mode (MPM) or a remaining mode to the current block, and, when the MPM applies to the current block, the intra prediction mode information may further include index information (e.g., intra_luma_mpm_idx) indicating one of the intra prediction mode candidates (MPM candidates). The intra prediction mode candidates (MPM candidates) may be composed of an MPM candidate list or an MPM list. In addition, when the MPM does not apply to the current block, the intra prediction mode information may further include remaining mode information (e.g., intra_luma_mpm_remainder) indicating one of the remaining intra prediction modes excluding the intra prediction mode candidates (MPM candidates). The image decoding apparatus may determine the intra prediction mode of the current block based on the intra prediction mode information. The MPM candidate modes may include the intra prediction modes of the neighboring blocks (e.g., the left neighboring block and the upper neighboring block) of the current block and additional candidate modes.

In addition, the intra prediction technique information may be implemented in various forms. For example, the intra prediction technique information may include intra prediction technique index information indicating one of the intra prediction techniques. As another example, the intra prediction technique information may include at least one of reference sample line information (e.g., intra_luma_ref_idx) indicating whether to apply MRL to the current block and, if applied, which reference sample line is used, ISP flag information (e.g., intra_subpartitions_mode_flag) indicating whether to apply ISP to the current block, ISP type information (e.g., intra_subpartitions_split_flag) indicating the split type of sub-partitions when applying ISP, flag information indicating whether to apply PDPC, or flag information indicating whether to apply LIP. In the present disclosure, ISP flag information may be referred to as an ISP application indicator.

The intra prediction mode information and/or the intra prediction technique information may be encoded/decoded through the coding method described in the present disclosure. For example, the intra prediction mode information and/or the intra prediction technique information may be encoded/decoded through entropy coding (e.g., CABAC, CAVLC) based on a truncated (rice) binary code.

Hereinafter, an intra prediction mode/type determination method according to the present disclosure will be described in greater detail.

When applying intra prediction to a current block, an intra prediction mode applying to the current block may be determined using an intra prediction mode of a neighboring block. For example, an image decoding apparatus may construct a most probable mode (mpm) list derived based on an intra prediction mode of a neighboring block (e.g., a left and/or top neighboring block) of the current block and additional candidate modes and select one of mpm candidates in the mpm list based on a received mpm index. Alternatively, the image decoding apparatus may select one of the remaining intra prediction modes which are not included in the mpm list based on remaining intra prediction mode information. For example, whether the intra prediction mode applying to the current bock is in the mpm candidates (that is, in the mpm list) or in the remaining mode may be indicated based on an mpm flag (e.g., intra_luma_mpm_flag). A value 1 of the mpm flag may indicate that the intra prediction mode for the current block is in the mpm candidates (mpm list) and a value 0 of the mpm flag may indicate that the intra prediction mode of the current block is not in the mpm candidates (mpm list). The mpm index may be signaled in the form of a syntax element mpm_idx or intra_luma_mpm_idx, and the remaining intra prediction mode information may be signaled in the form of a syntax element rem_intra_luma_pred_mode or intra_luma_mpm_remainder. For example, the remaining intra prediction mode information may indicate one of the remaining intra prediction modes which are not included in the mpm candidates (mpm list) among all intra prediction modes and are indexed in order of prediction mode numbers. The intra prediction mode may be an intra prediction mode of a luma component (sample). Hereinafter, the intra prediction mode information may include at least one of the mpm flag (e.g., intra_luma_mpm_flag), the mpm index (e.g., mpm_idx or intra_luma_mpm_idx) or the remaining intra prediction mode information (rem_intra_luma_pred_mode or intra_luma_mpm_remainder). In the present disclosure, the MPM list may be referred to as various terms such as MPM candidate list, candModeList, etc.

Figure 10:
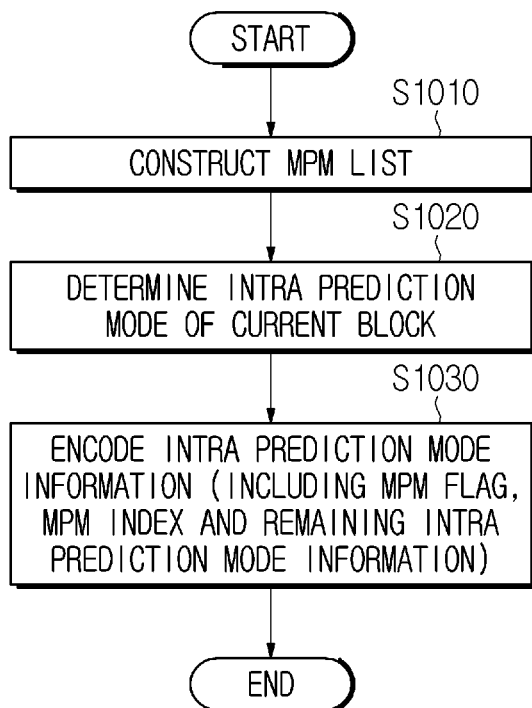
FIG. 10 is a flowchart illustrating an intra prediction mode signaling procedure in an image encoding apparatus.

FIG. 10 is a flowchart illustrating an intra prediction mode signaling procedure in an image encoding apparatus.

Referring to FIG. 10, the image encoding apparatus may construct an MPM list for a current block (S1010). The MPM list may include candidate intra prediction modes (MPM candidates) which are highly likely to apply to the current block. The MPM list may include the intra prediction mode of a neighboring block and may further include specific intra prediction modes according to a predetermined method.

The image encoding apparatus may determine the intra prediction mode of the current block (S1020). The image encoding apparatus may perform prediction based on various intra prediction modes and perform rate-distortion optimization (RDO) based on this to determine an optimal intra prediction mode. In this case, the image encoding apparatus may determine the optimal intra prediction mode using only MPM candidates included in the MPM list or determine the optimal intra prediction mode by further using not only the MPM candidates included in the MPM list but also the remaining intra prediction modes. Specifically, for example, if the intra prediction type of the current block is a specific type (e.g., LIP, MRL or ISP) which is not a normal intra prediction type, the image encoding apparatus may determine the optimal intra prediction mode using only the MPM candidates. That is, in this case, the intra prediction mode of the current block may be determined only from the MPM candidates and, in this case, the mpm flag may not be encoded/signaled. The image decoding apparatus may estimate that the mpm flag is 1, without separately receiving the mpm flag, in the case of the specific type.

Meanwhile, in general, when the intra prediction mode of the current is one of the MPM candidates in the MPM list, the image encoding apparatus may generate an mpm index indicating one of the MPM candidates. If the intra prediction mode of the current block is not present in the MPM list, remaining intra prediction mode information indicating the same mode as the intra prediction mode of the current among the remaining intra prediction modes which are not included in the MPM list may be generated.

The image encoding apparatus may encode and output intra prediction mode information in the form of a bitstream (S1030). The intra prediction mode information may include the above-described mpm flag, mpm index and/or remaining intra prediction mode information. In general, the mpm index and the remaining intra prediction mode information have an alternative relationship and thus are not simultaneously signaled in indicating the intra prediction mode of one block. That is, when the value of the mpm flag is 1, the mpm index may be signaled and, when the value of the mpm flag is 0, the remaining intra prediction mode information may be signaled. However, as described above, when applying a specific intra prediction type to the current block, the mpm flag is not signaled and the value thereof is inferred to be 1 and only the mpm index may be signaled. That is, in this case, the intra prediction mode information may include only the mpm index.

Although, in the example shown in FIG. 10, S1020 is shown as being performed after S1010, this is an example and S1020 may be performed before S1010 or they may be simultaneously performed.

Figure 11:
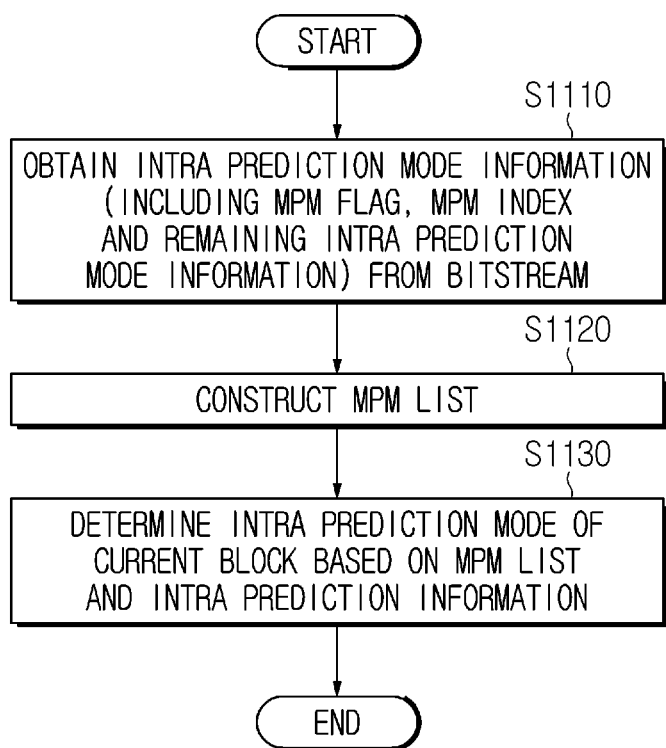
FIG. 11 is a flowchart illustrating an intra prediction mode determination procedure in an image decoding apparatus.

FIG. 11 is a flowchart illustrating an intra prediction mode determination procedure in an image decoding apparatus.

The image decoding apparatus may determine an intra prediction mode of a current block based on the intra prediction mode information determined and signaled by the image encoding apparatus.

Referring to FIG. 11, the image decoding apparatus may obtain intra prediction mode information from a bitstream (S1110). As described above, the intra prediction mode information may include at least one of an mpm flag, an mpm index or a remaining intra prediction mode.

The image decoding apparatus may construct an MPM list (S1120). The MPM list may be constructed to be equal to the MPM list constructed by the image encoding apparatus. That is, the MPM list may include an intra prediction mode of a neighboring block and may further include specific intra prediction modes according to a predetermined method.

Although, in the example shown in FIG. 11, S1120 is shown as being performed after S1110, this is an example and S1120 may be performed before S1110 or they may be simultaneously performed.

The image decoding apparatus determines the intra prediction mode of the current block based on the MPM list and the intra prediction mode information (S1130). Step S1130 will be described in greater detail with reference to FIG. 12.

Figure 12:
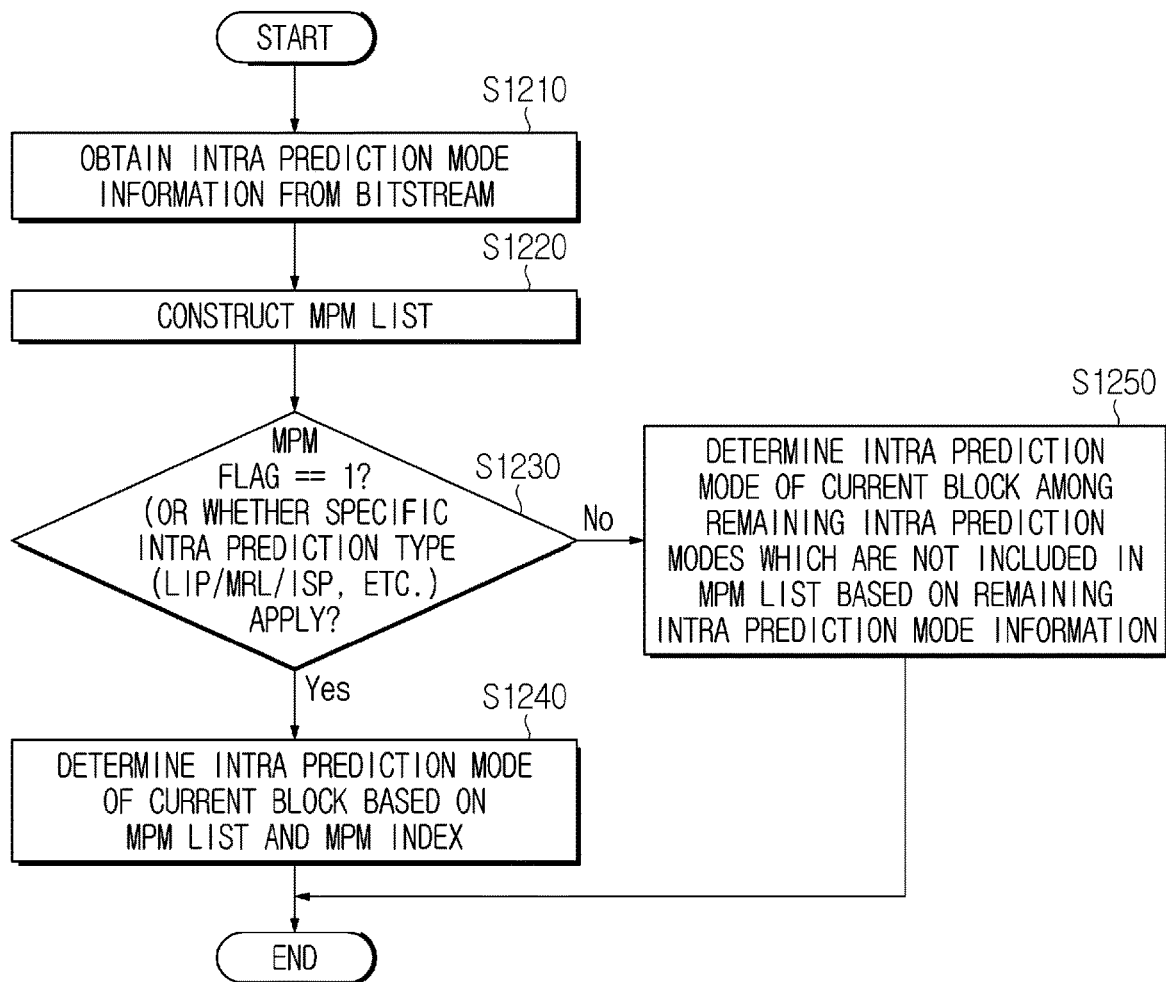
FIG. 12 is a flowchart illustrating an intra prediction mode derivation procedure in more detail.

FIG. 12 is a flowchart illustrating an intra prediction mode derivation procedure in more detail.

Steps S1210 and S1220 of FIG. 12 may correspond to steps S1110 and S1120 of FIG. 11, respectively. Accordingly, a detailed description of steps S1210 and S1220 will be omitted.

The image decoding apparatus may obtain intra prediction mode information from a bitstream, construct an MPM list (S1210 and S1220), and determine a predetermined condition (S1230). Specifically, as shown in FIG. 12, when the value of an mpm flag is 1 (in S1230, Yes), the image decoding apparatus may derive a candidate indicated by the mpm index among the MPM candidates in the MPM list as the intra prediction mode of the current block (S1240). As another example, when the value of the mpm flag is 0 (in S1230, No), the image decoding apparatus may derive an intra prediction mode indicated by the remaining intra prediction mode information among remaining intra prediction modes which are not included in the MPM list as the intra prediction mode of the current block (S1250). Meanwhile, as another example, when the intra prediction type of the current block is a specific type (e.g., LIP, MRL or ISP) (in S1230, Yes), the image decoding apparatus may derive a candidate indicated by the mpm index in the MPM list as the intra prediction mode of the current block, without checking the mpm flag (S1240).

Figure 13:
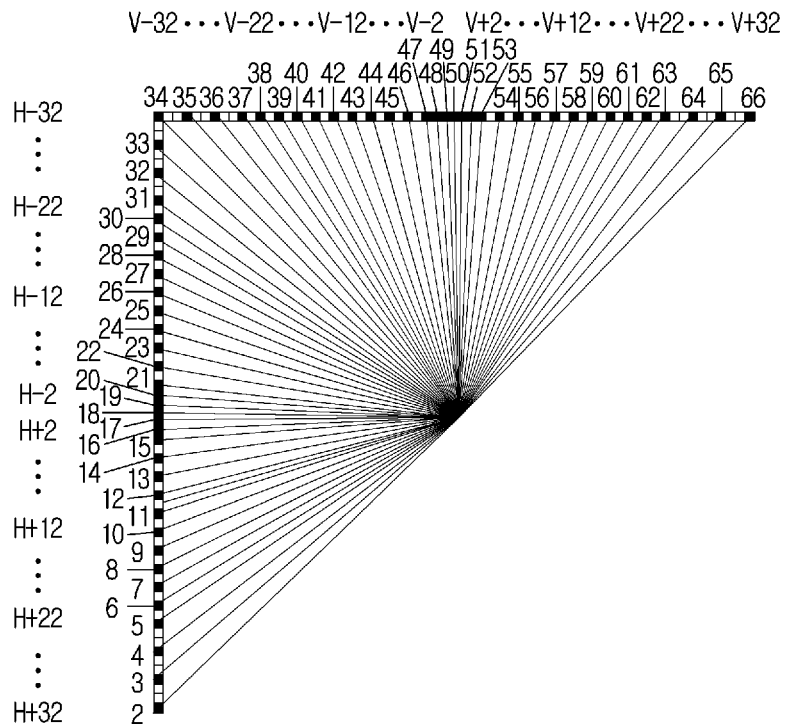
FIG. 13 is a view showing an intra prediction direction according to an embodiment of the present disclosure.

FIG. 13 is a view showing an intra prediction direction according to an embodiment of the present disclosure.

The intra prediction mode may include, for example, two non-directional intra prediction modes and 33 directional intra prediction modes. The non-directional intra prediction modes may include a planar intra prediction mode and a DC intra prediction mode, and the directional intra prediction modes may include second to $34^{th}$ intra prediction modes. The planar intra prediction mode may be referred to as a planar mode, and the DC intra prediction mode may be referred to as a DC mode.

In order to capture any edge direction presented in natural video, as shown in FIG. 13, the intra prediction mode may include two non-directional intra prediction modes and 65 extended directional intra prediction modes. The non-directional intra prediction modes may include a planar mode and a DC mode, and the directional intra prediction modes may include second to $66^{th}$ intra prediction modes. The extended intra prediction modes are applicable to blocks having all sizes, and are applicable to both a luma component (luma block) and a chroma component (chroma block).

Alternatively, the intra prediction mode may include two non-directional intra prediction modes and 129 directional intra prediction modes. The non-directional intra prediction modes may include a planar mode and a DC mode, and the directional intra prediction modes may include second to $130^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof is considered for LM parameter derivation and may apply only to a chroma component.

For example, the intra prediction mode may be, for example, indexed as shown in Table 2 below.

TABLE 2

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Figure 14:
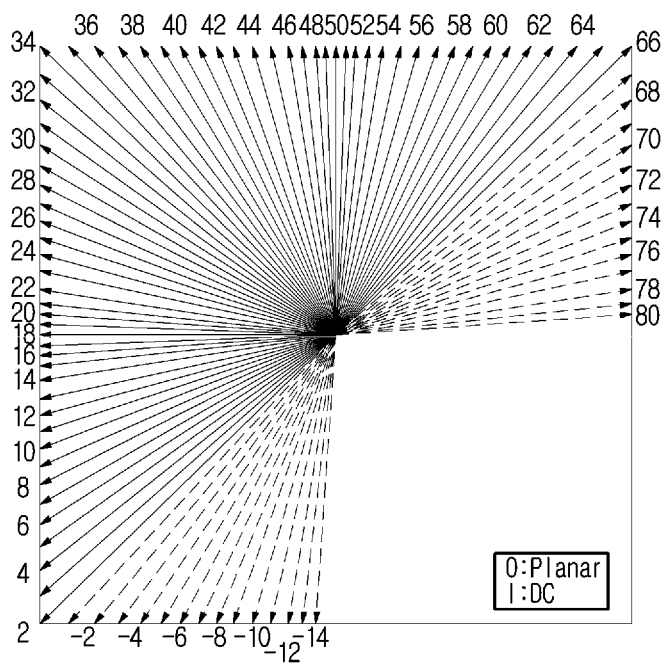
FIG. 14 is a view showing an intra prediction direction according to another embodiment of the present disclosure.

FIG. 14 shows an intra prediction direction according to another embodiment of the present disclosure. In FIG. 14, a dotted-line direction shows a wide angle mode applying only to a non-square block. As shown in FIG. 14, in order to capture any edge direction presented in natural video, the intra prediction mode according to an embodiment may include two non-directional intra prediction modes and 93 directional intra prediction modes. The non-directional intra prediction modes may include a planar mode and a DC mode, and the directional intra prediction modes may include second to $80^{th}$ and $-1^{st}$ to $-14^{th}$ intra prediction modes, as denoted by arrow of FIG. 14. The planar mode may be denoted by INTRA PLANAR, and the DC mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80. Hereinafter, a prediction sample derivation method of a chroma component block according to the present disclosure will be described in detail.

When intra prediction is performed with respect to a current block, prediction for a luma component block (luma block) of the current block and prediction for a chroma component block (chroma block) are performed, and, in this case, an intra prediction mode for the chroma component (chroma block) may be set separately from an intra prediction mode for the luma component (luma block).

For example, the intra prediction mode for the chroma block (intra chroma prediction mode) may be indicated based on intra chroma prediction mode information, and the intra chroma prediction mode information may be signaled in the form of a syntax element intra_chroma_pred_mode. For example, the intra chroma prediction mode information may indicate a planar mode, a DC mode, a vertical mode, a horizontal mode, a derived mode (DM), or CCM modes. For example, when the intra prediction mode includes two non-directional intra prediction modes and 33 directional intra prediction modes, the planar mode may indicate intra prediction mode 0, the DC mode may indicate intra prediction mode 1, the vertical mode may indicate intra prediction mode 26, and the horizontal mode may indicate intra prediction mode 10. As another example, when the intra prediction mode includes two non-directional intra prediction modes and 65 directional intra prediction modes, the planar mode may indicate intra prediction mode 0, the DC mode may indicate intra prediction mode 1, the vertical mode may indicate intra prediction mode 50, and the horizontal mode may indicate intra prediction mode 18. DM may also be referred to as a direct mode. CCLM may also be referred to as LM.

Meanwhile, DM and CCLM are dependent intra prediction modes for predicting the chroma block using information on the luma block. The DM may indicate a mode in which the same intra prediction mode as the intra prediction mode for the luma component (luma block) applies as the intra prediction mode for the chroma component (chroma block). In addition, the CCLM may indicate an intra prediction mode in which samples derived by subsampling reconstructed samples of the luma block in a process of generating the prediction block of the chroma block and then applying CCLM parameters α and β to the subsampled samples are used as the prediction samples of the chroma block.

Overview of DM Mode

When a current chroma block is predicted in the DM, the intra prediction mode of the current chroma block may be derived as the intra prediction mode of a corresponding luma block. For example, the intra prediction mode at a predetermined position of the corresponding luma block may be used as the intra prediction mode of the current chroma block.

Figure 15:
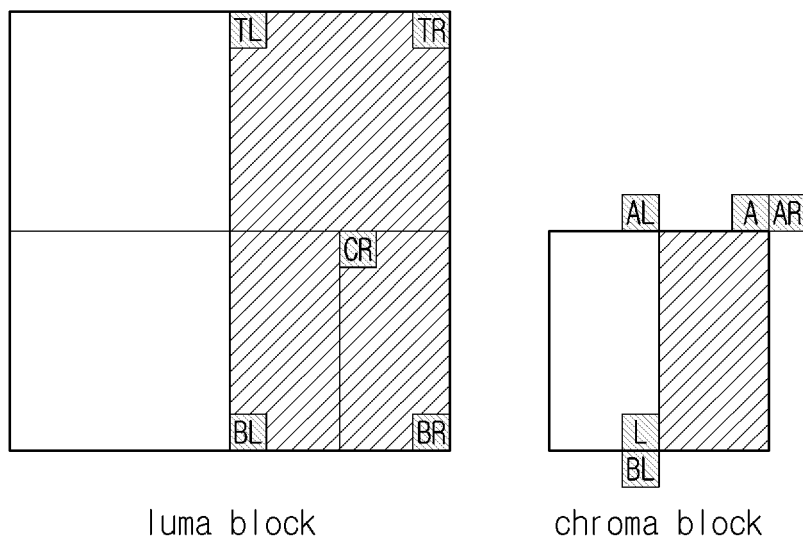
FIG. 15 is a view showing a predetermined position for deriving an intra prediction mode of a current chroma block in a DM mode.

FIG. 15 is a view showing a predetermined position for deriving an intra prediction mode of a current chroma block in a DM mode.

In FIG. 15, for example, a chroma block may be vertically binary-split and a current chroma block may be a block of a shaded area. In this case, a luma block corresponding to the current chroma block may be a block of a shaded area in the luma block.

In FIG. 15, the intra prediction mode (intra chroma prediction mode) of the current chroma block in the DM may be derived as an intra prediction mode (intra luma prediction mode) at a predetermined position in a corresponding luma block. For example, an intra prediction mode of a block covering a center bottom-right sample (center position) (CR) in the corresponding luma block may be determined to be the intra prediction mode of the current chroma block. However, the predetermined position is not limited to the center position and may be, for example, another position within the corresponding luma block such as a top-left position TL.

Alternatively, multiple direct modes (MDM) may apply to the current chroma block.

Multiple DM is a mode used by extending the single DM to a plurality of modes. In order to derive the intra prediction mode of the current chroma block, a DM candidate list including a plurality of DM modes may be constructed and one of candidates included in the DM candidate list may be derived as the intra prediction mode of the current chroma mode. When applying multiple DM, the DM candidate list may include a plurality of DM candidates which will be described below.

- intra prediction mode at CR, TL, TR, BL or BR position of the corresponding luma block
- intra prediction mode of L, A, BL, AR or AL position which is the neighboring block of the current chroma block
- PLANAR mode and DC mode
- directional mode derived by adding or subtracting an offset (e.g., 1) to or from an already included directional mode
- default DM candidate mode: vertical mode, horizontal mode, modes 2, 34, 66, 10 and 26 (in the case of 65 directional modes)
- when four default DM candidates (PLANAR mode, DC mode, vertical mode and horizontal mode) are not included in the DM candidate list, DM candidates which are already included are replaced with default DM candidates which are not included.

Overview of Signaling of Intra Prediction Mode of Chroma Block

The intra prediction mode of the chroma block may be encoded using a total of eight intra prediction modes. The eight intra prediction modes may include 5 conventional intra prediction modes and cross-component linear model mode (CCLM) mode(s).

Whether or not CCLM is available may be determined based on information signaled at a higher level (e.g., sps_cclm_enabled_flag transmitted at a sequence level). Table 3 shows a mapping table for intra prediction mode derivation of the current chroma block when CCLM is not available (sps_cclm_enabled_flag=0).

TABLE 3

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

As shown in Table 3, the intra prediction mode of the chroma block may be derived based on intra chroma prediction mode information (intra_chroma_pred_mode) and/or the intra prediction mode (IntraPredModeY) of the corresponding luma block. The intra prediction mode of the corresponding luma block may be determined to be the intra prediction mode of the luma block covering the center bottom-right sample (center position) of the current block or the chroma block. The center bottom-right sample position may be derived as (xCb+cbWidth/2, yCb+cbHeight/2), and, in this case, (xCb, yCb) means the coordinates of the top-left sample of the corresponding luma block, and cbWidth and cbHeight respectively means the width and height of the corresponding luma block. For example, in Table 4, when intra_chroma_pred_mode is 0, the intra prediction mode of the chroma block is determined to be 0 (planar mode), and, when intra_chroma_pred_mode is 1, the intra prediction mode of the chroma block may be determined to be 50 (vertical mode). In addition, when intra_chroma_pred_mode is 2, the intra prediction mode of the chroma block may be determined to be 18 (horizontal mode), and, when intra_chroma_pred_mode is 3, the intra prediction mode of the chroma block may be determined to be 1 (DC mode). In addition, when intra_chroma_pred_mode is 4, the intra prediction mode of the chroma block may be determined to be the same value as the intra prediction mode of the corresponding luma block. That is, when intra_chroma_pred_mode being 4 indicates that the intra prediction mode of the chroma block is derived as DM. The indices of the intra prediction modes of the chroma block (IntraPredModeC[xCb] [yCb]) derived based on Table 3 may correspond to the indices of the intra prediction modes shown in Table 2.

According to Table 4, when the value of intra_chroma_pred_mode is 0 to 3, the intra prediction mode of the chroma block may be determined to be 66 instead of the above-described intra prediction mode (planar mode, vertical mode, horizontal mode or DC mode) according to the value of IntraPredModeY. For example, the value 0 of intra_chroma_pred_mode indicates a planar mode, and, in this case, when IntraPredModeY is 0 (planar mode), the intra prediction mode of the chroma block may be determined to be 66. However, as described above, when both the intra prediction mode of the chroma block and the intra prediction mode of the corresponding luma block are the same as the planar mode, the value of intra_chroma_pred_mode may be determined to be 4 which indicates the DM instead of 0. Accordingly, when the value of intra_chroma_pred_mode is 0 to 3, the case where the intra prediction mode of the chroma block is determined to be 66 does not substantially occur. That is, when intra_chroma_pred_mode is 0 to 3, the intra prediction mode of the chroma block may be derived as one of the planar mode, the vertical mode, the horizontal mode and the DC mode based on the value of intra_chroma_pred_mode, and, when intra_chroma_pred_mode is 4, the intra prediction mode of the chroma block may be derived based on the value of intra_chroma_pred_mode and the intra prediction mode of the corresponding luma block. However, the present disclosure is not limited to the above-described example, and may include an embodiment in which, even when intra_chroma_pred_mode is 0 to 3, the intra prediction mode of the chroma block is derived based on the intra chroma prediction mode information (e.g., intra_chroma_pred_mode) and the intra prediction mode of the corresponding luma block.

Table 4 shows a mapping table for intra prediction mode derivation of the chroma block when CCLM is available (sps_cclm_enabled_flag=1).

TABLE 4

| | IntraPredModeY[ xCb + cbWidth / 2 ][ yCb + cbHeight / 2 ] | | | | |
|---|---|---|---|---|---|
| intra_chroma_pred_mode[ xCb ][ yCb ] | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |

TABLE 4-continued

| intra_chroma_pred_mode[ xCb ][ yCb ] | IntraPredModeY[ xCb + cbWidth / 2 ][ yCb + cbHeight / 2 ] | | | | |
| --- | --- | --- | --- | --- | --- |
| | 0 | 50 | 18 | 1 | X ( 0 <= X <= 66 ) |
| 5 | 82 | 82 | 82 | 82 | 82 |
| 6 | 83 | 83 | 83 | 83 | 83 |
| 7 | 0 | 50 | 18 | 1 | X |

Table 4 shows the case where CCLM is available and further includes modes for signaling the CCLM in addition to the modes of Table 3. In Table 4, when intra_chroma_pred_mode is 4 to 6, these may indicate INTRA_LT_CCLM, INTRA_L_CCLM and INTRA_T_CCLM, respectively. In Table 4, the case where intra_chroma_pred_mode is 0 to 3 and 7 may correspond to the case where intra_chroma_pred_mode is 0 to 4 in Table 3, respectively. That is, intra_chroma_pred_mode being 7 indicates that the intra prediction mode of the chroma block is derived as DM.

As described with reference to Tables 3 and 4, the intra prediction mode of the chroma block may be derived based on intra chroma prediction mode information (intra_chroma_pred_mode) and/or the intra prediction mode of the corresponding luma block. For example, when the intra chroma prediction mode information indicates the DM, the intra prediction mode of the chroma block may be determined to be the same as the intra prediction mode of the corresponding luma block.

Figure 16:
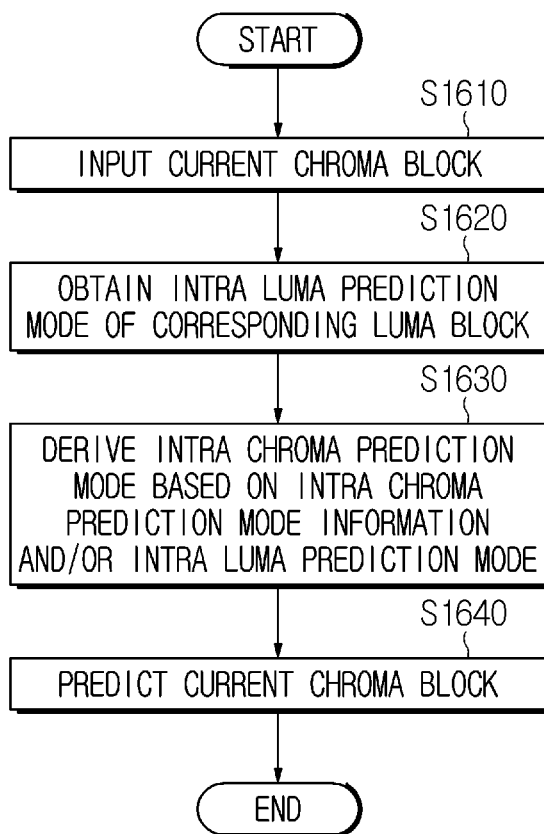
FIG. 16 is a flowchart illustrating a conventional method of deriving an intra prediction mode of a chroma block based on a corresponding luma block.

FIG. 16 is a flowchart illustrating a conventional method of deriving an intra prediction mode of a chroma block based on a corresponding luma block.

When an intra-predicted current chroma block is input (S1610), the intra luma prediction mode of the corresponding luma block may be obtained (S1620). The intra luma prediction mode may be, for example, obtained from a predetermined position (center position) in the corresponding luma block, as described above. After the intra luma prediction mode is obtained, the intra prediction mode of the current chroma block may be derived by referring to Table 3 or 4 based on the intra chroma prediction mode information obtained from a bitstream and/or the intra luma prediction mode (S1630). Thereafter, the prediction block of the current chroma block may be generated by performing intra prediction with respect to the current chroma block using the derived intra chroma prediction mode (S1640).

In step S1630, when the intra chroma prediction mode information indicates the DM, the intra prediction mode of the current chroma block may be derived as the same value as the intra luma prediction mode of the corresponding luma block. When the intra chroma prediction mode information indicates a mode other than the DM, the intra prediction mode of the current chroma block may be derived as one of the planar mode, the DC mode, the vertical mode, the horizontal mode and the CCLM based on the intra chroma prediction mode information.

However, the conventional method described with reference to FIG. 16 does not consider the case where the intra luma prediction mode of the corresponding luma block is not present. For example, as described above, a luma block and a chroma block in one CTU may be split into the same block tree structure (SINGLE_TREE) or an individual block tree structure (DUAL_TREE). In the case of the dual tree, the luma block and the chroma block corresponding thereto may be encoded in the same prediction mode or different prediction modes. That is, the luma block corresponding to the intra-predicted chroma block may be intra-predicted or may be encoded in another prediction mode. If the corresponding luma block is not intra-predicted, in step S1620, the intra luma prediction mode of the corresponding luma block may not be obtained, and thus, for example, there may be a problem in that the intra prediction mode of the chroma block intra-predicted in the DM may not be derived.

Hereinafter, embodiments of the present disclosure for solving the problems of the conventional method will be described.

Figure 17:
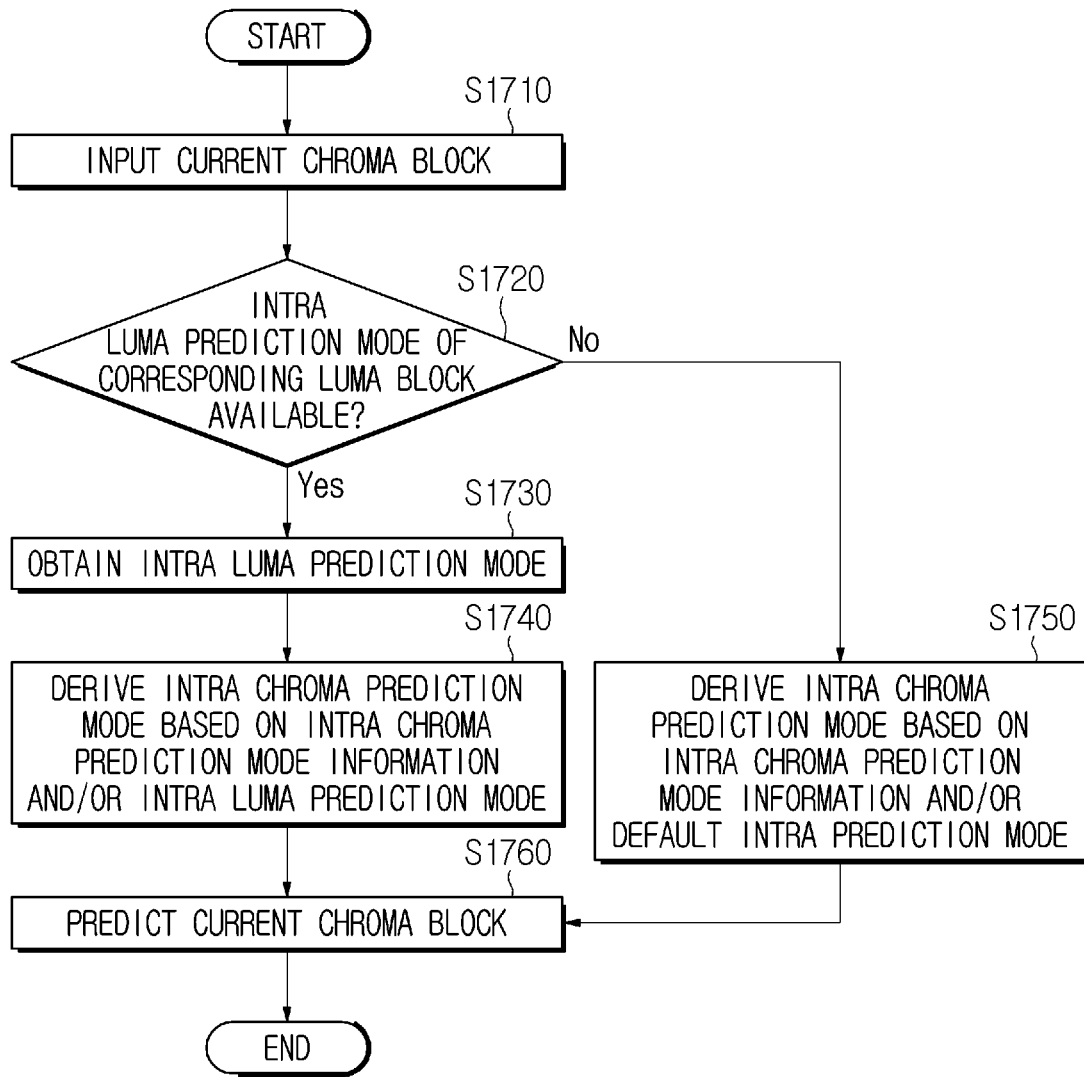
FIG. 17 is a flowchart illustrating an embodiment of the present disclosure of deriving an intra prediction mode of a chroma block based on a corresponding luma block.

FIG. 17 is a flowchart illustrating an embodiment of the present disclosure of deriving an intra prediction mode of a chroma block based on a corresponding luma block.

According to an embodiment of the present disclosure shown in FIG. 17, when the intra prediction mode of the corresponding luma block is not available, it is possible to solve the problem of the conventional method by using a default intra prediction mode.

Referring to FIG. 17, first, an intra-predicted current chroma block is input (S1710). Thereafter, it may be determined whether the intra luma prediction mode of the corresponding luma block necessary to derive the intra prediction mode of the current chroma block is available (S1720). As described above, the intra luma prediction mode of the corresponding luma block may be obtained from a predetermined position (e.g., center position) of the corresponding luma block. Accordingly, determination of step S1720 may be performed by checking the prediction mode at the predetermined position of the corresponding luma block. For example, when the prediction mode at the predetermined position of the corresponding luma block is an intra mode, it may be determined that the intra luma prediction mode is available. Alternatively, when the prediction mode at the predetermined position of the corresponding luma block is a mode other than the intra mode (e.g., IBC mode), it may be determined that the intra luma prediction mode is not available. As another example, determination of step S1720 may be made based on whether the predetermined position of the corresponding luma block has an intra luma prediction mode.

Upon determining that the intra luma prediction mode is available in step S1720, steps S1730, S1740 and S1760 may be sequentially performed. Steps S1730, S1740 and S1760 respectively correspond to steps S1620, S1630 and S1640 of FIG. 16 and thus a detailed description thereof will be omitted.

Upon determining that the intra luma prediction mode is not available in step S1720, a default intra prediction mode may be used. That is, the intra prediction mode of the current chroma block may be derived based on the intra chroma prediction mode information and/or the default intra prediction mode (S1750). In this case, instead of an unavailable intra luma prediction mode, a default intra prediction mode may be used. For example, when the intra chroma prediction mode information indicates a DM, the intra prediction mode of the current chroma block may be derived as a default intra prediction mode. In addition, when the intra chroma prediction mode information indicates a mode other than the DM mode, the intra prediction mode of the current chroma block may be derived as one of the planar mode, the DC mode, the vertical mode, the horizontal mode and the CCLM based on the intra chroma prediction mode information. Thereafter, the prediction block of the current chroma block may be generated by performing intra prediction with respect to the current chroma block using the derived intra chroma prediction mode (S1760).

In step S1750, as the default intra prediction mode, the DC mode or the planar mode may be used. However, the present disclosure is not limited thereto and a predefined intra prediction mode or an intra prediction mode signaled through a bitstream may be used as the default intra prediction mode.

Figure 18:
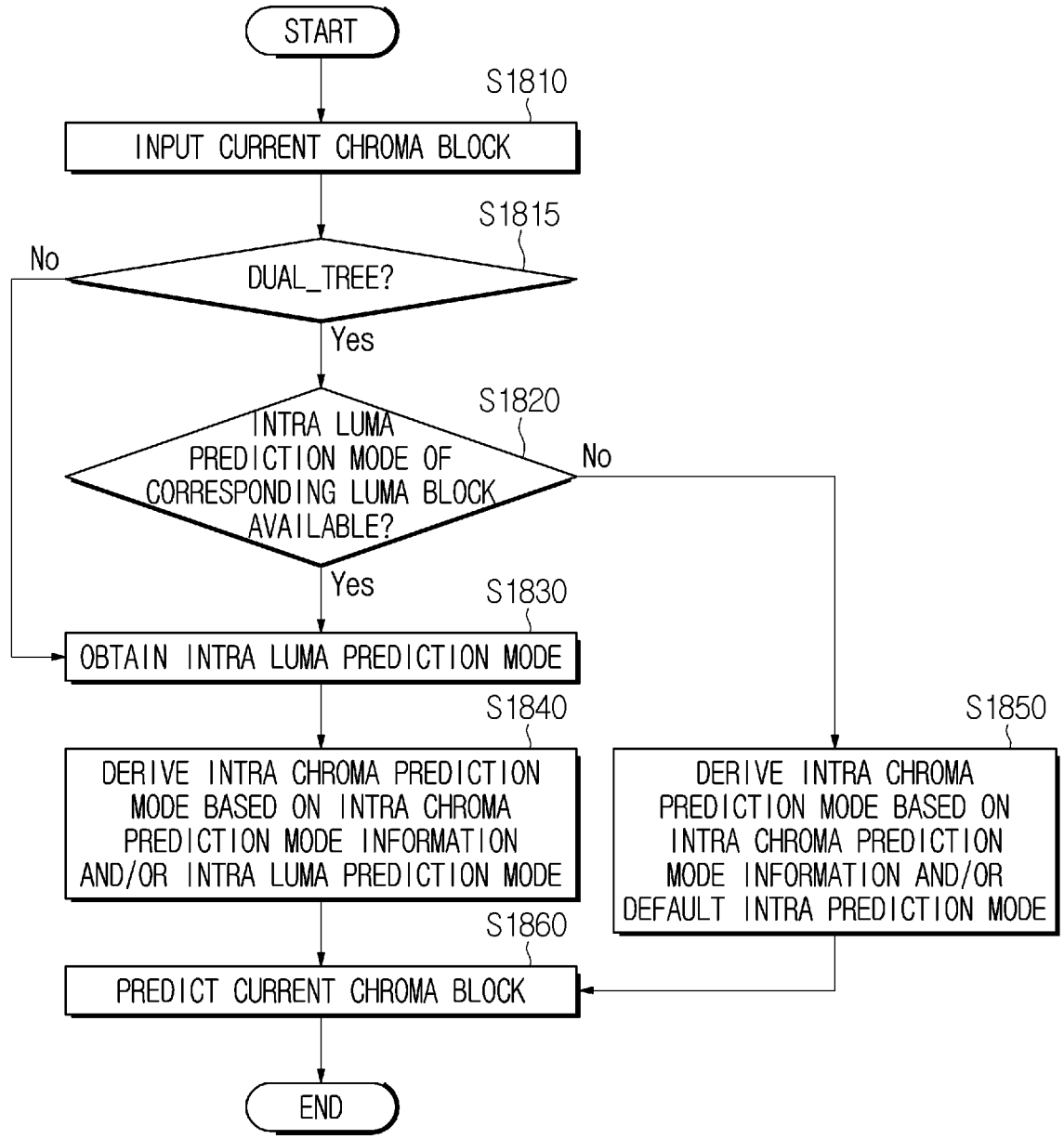
FIG. 18 is a flowchart illustrating another embodiment of the present disclosure of deriving an intra prediction mode of a chroma block based on a corresponding luma block.

FIG. 18 is a flowchart illustrating another embodiment of the present disclosure of deriving an intra prediction mode of a chroma block based on a corresponding luma block.

According to the embodiment shown in FIG. 18, when the intra prediction mode of the corresponding luma block is not available, it is possible to solve the above-described problem of the conventional method by using a default intra prediction mode. In addition, according to the embodiment shown in FIG. 18, whether the intra prediction mode of the corresponding luma block is available is determined only when the tree structure of the current block is a dual tree.

Referring to FIG. 18, first, an intra-predicted current chroma block is input (S1810). Thereafter, it is determined whether the tree structure of a current block is a dual tree structure (S1815). When the tree structure of the current block is not a dual tree structure, that is, when it is a single tree structure, since a chroma block and a corresponding luma block may be regarded as being equally intra-predicted, it may be determined that the intra luma prediction mode of the corresponding luma block is available. Accordingly, in this case, determination of step S1820 may be skipped. In other words, when the tree structure of the current block is a single tree structure, steps S1830, S1840 and S1860 may be sequentially performed to generate the prediction block of the current chroma block.

When the tree structure of the current block is a dual tree structure in step S1815, determination of step S1820 may be performed. Processing according to the result of determination of step S1820 is equal to that described with reference to FIG. 17 and thus a repeated description thereof will be omitted. That is, steps S1820 to S1860 may correspond to steps S1720 to S1760 of FIG. 17, respectively.

Determination of steps S1815 and S1820 of FIG. 18 may be a specific embodiment of step S1720 of FIG. 17.

Figure 19:
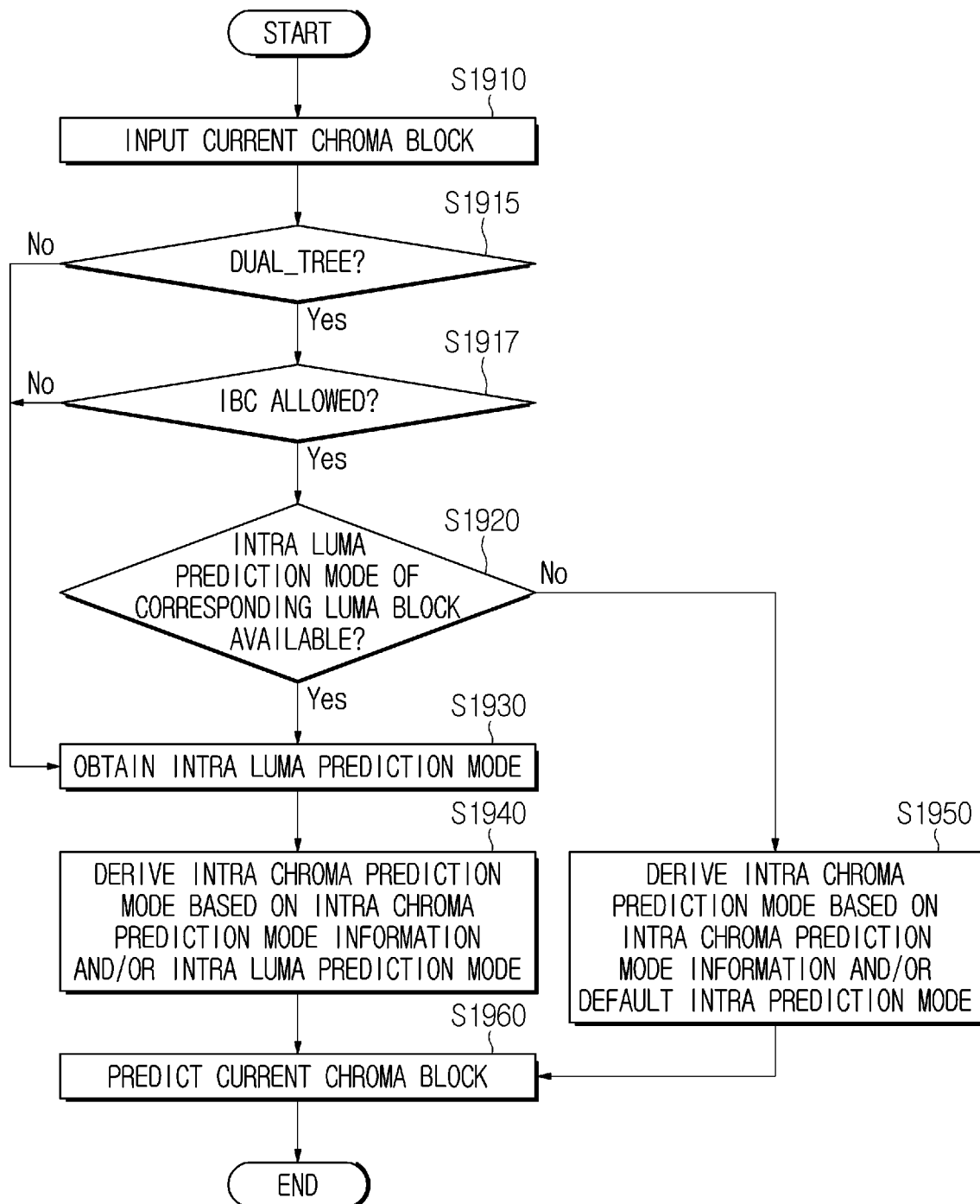
FIG. 19 is a flowchart illustrating another embodiment of the present disclosure of deriving an intra prediction mode of a chroma block based on a corresponding luma block.

FIG. 19 is a flowchart illustrating another embodiment of the present disclosure of deriving an intra prediction mode of a chroma block based on a corresponding luma block.

According to the embodiment shown in FIG. 19, when the intra prediction mode of the corresponding luma block is not available, it is possible to solve the problem of the conventional method by using a default intra prediction mode. In addition, according to the embodiment shown in FIG. 19, whether the intra prediction mode of the corresponding luma block is available is determined only when the tree structure of the current block is a dual tree and IBC is allowed.

Referring to FIG. 19, first, an intra-predicted current chroma block is input (S1910). Thereafter, it is determined whether the tree structure of the current block is a dual tree structure (S1915). When the tree structure of the current block is not a dual tree structure, that is, when it is a single tree structure, as described with reference to FIG. 18, since the intra luma prediction mode of the corresponding luma block is regarded as being available, determination of steps S1917 and S1920 may be skipped. Accordingly, in the case of the single tree structure, steps S1930, S1940 and S1960 may be sequentially performed to generate the prediction block of the current chroma block.

When the tree structure of the current block is a dual tree structure in step S1915, it may be determined whether IBC is allowed (S1917). Whether IBC is allowed may be determined based on information (e.g., sps_ibc_enabled_flag) signaled at a higher level (e.g., sequence) of the current block. For example, when sps_ibc_enabled_flag is 1, it may be determined that IBC is allowed and, when sps_ibc_enabled_flag is 0, it may be determined that IBC is not allowed.

As described above, only a single tree may be allowed for P and B slice/tile groups, and both a single tree and a dual tree may be allowed for I slice/tile groups. Accordingly, when the tree structure of the current block is a dual tree structure, the current block belongs to an I slice/tile group. When it is assumed that prediction for a block included in the I slice/tile group is limited to intra prediction and IBC prediction, the current block may be predicted as one of intra prediction or IBC prediction. Accordingly, when IBC is not allowed, it may be determined that the current block is intra-predicted. That is, upon determining that IBC is not allowed in step S1917, since the corresponding luma block may be regarded as being intra-predicted, determination of step S1920 may be skipped and steps S1930, S1940 and S1960 may be immediately performed. Upon determining that IBC is allowed in step S1917, since the corresponding luma block may be intra-predicted or IBC-predicted, in this case, determination of step S1920 may be performed. Processing according to the result of determination of step S1920 is equal to that described with reference to FIG. 17 and thus a repeated description thereof will be omitted. That is, steps S1920 to S1960 may correspond to steps S1720 to S1760 of FIG. 17, respectively.

In the example shown in FIG. 19, since it is assumed that only intra prediction or IBC prediction is possible for blocks belonging to the I slice/tile group, it is only determined that IBC is allowed in step S1917. However, when a third prediction mode is possible for blocks belonging to the I slice/tile group in addition to intra prediction or IBC prediction, not only whether IBC is allowed but also whether the third prediction mode is allowed may be determined in step S1917. In this case, step S1920 may be skipped only when both IBC and the third prediction mode are not allowed. That is, when any one of IBC and the third prediction mode is allowed, step S1920 and a subsequent process thereof may be performed as described above.

Determination of steps S1915, S1917 and S1920 of FIG. 19 may be a specific embodiment of step S1720 of FIG. 17.

As modified examples of FIGS. 18 and 19, prior to determining whether the tree structure of the current block is a dual tree structure, the type of the slice/tile group of the current block may be determined. When the type of the slice/tile group of the current block is a P or B slice/tile group, since the tree structure of the current block is determined to be a single tree structure, it is not necessary to determine whether the tree structure of the current block is a dual tree structure (S1815 or S1915). Accordingly, in the case of the P or B slice/tile group, the corresponding intra luma prediction mode may be immediately obtained and then the intra chroma prediction mode may be derived based on this. In addition, when the type of the slice/tile group of the current block is an I slice/tile group, since the tree structure of the current block may be a single tree structure or a dual tree structure, steps of FIGS. 18 and 19 including S1815 or S1915 may be performed.

Figure 20:
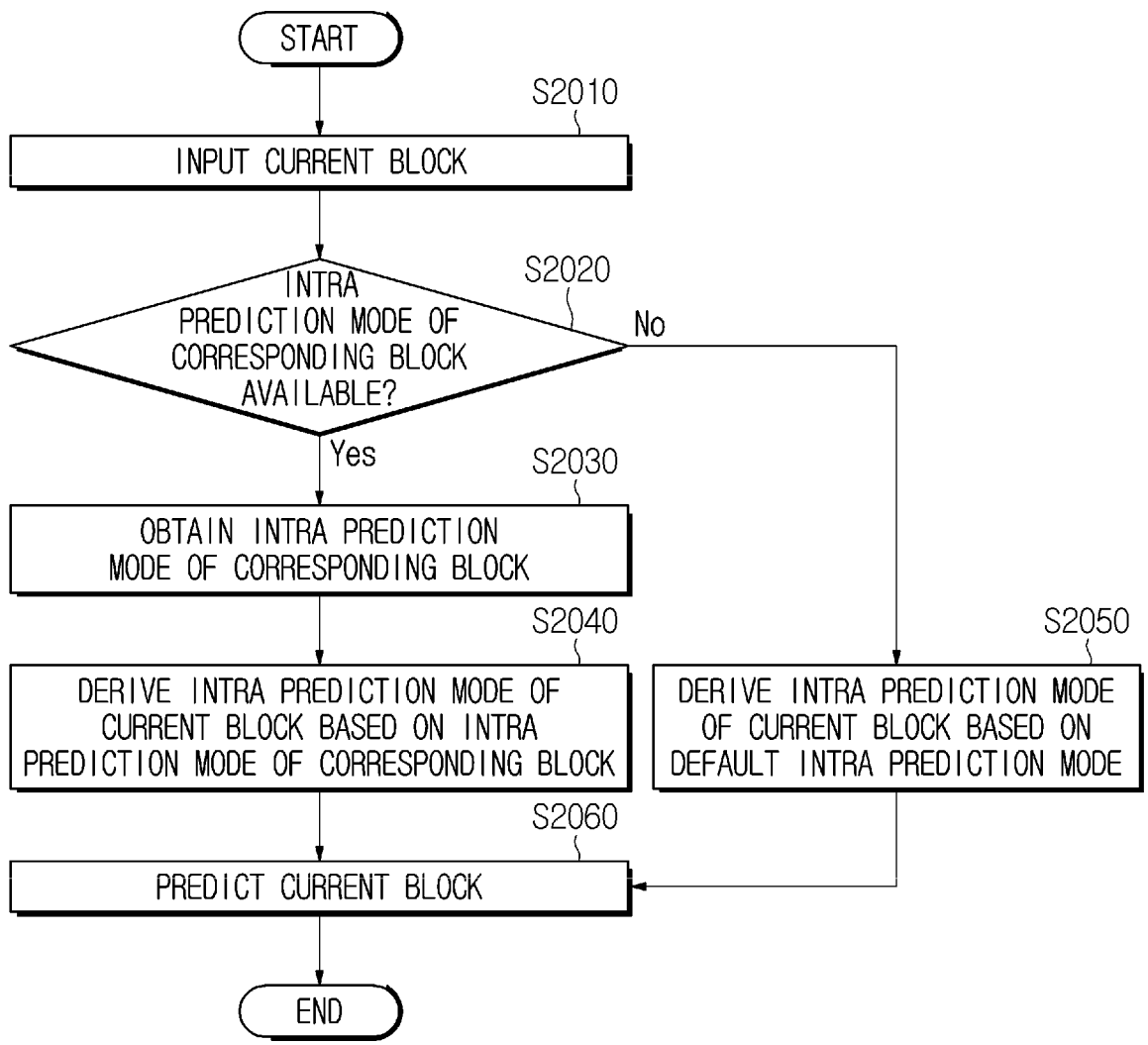
FIG. 20 is a flowchart illustrating another embodiment of the present disclosure of deriving an intra prediction mode of a current block based on a corresponding block.

FIG. 20 is a flowchart illustrating another embodiment of the present disclosure of deriving an intra prediction mode of a current block based on a corresponding block.

First, a current block to be encoded/decoded may be input (S2010). The current block is an intra-predicted block and the intra prediction mode of the current block may be derived from the intra prediction mode of a corresponding block without being directly signaled. For example, the current block may be a chroma block. When the current block is input, a corresponding block corresponding to the current block may be specified and whether the intra prediction mode of the corresponding block is available may be determined (S2020). For example, the corresponding block may be a corresponding luma block corresponding to a chroma block. Step S2020 may be performed based on determination of whether the corresponding block is intra-predicted. Alternatively, step S2020 may be performed based on the determination of whether the prediction mode of the corresponding block is a mode (e.g., IBC mode) other than the intra mode. Alternatively, step S2020 may be performed based on determination of whether the corresponding block has an intra prediction mode. For example, when the corresponding block is intra-predicted or has an intra prediction mode, it may be determined that the intra prediction mode of the corresponding block is available. When the corresponding block is predicted in a mode other than the intra mode or does not have an intra prediction mode, it may be determined that the intra prediction mode of the corresponding block is not available. Alternatively, as described above, step S2020 may include at least one of determination of the type of the slice/tile group including the current block, determination of the tree structure of the current block, or determination of whether the IBC or third prediction mode is allowed for the current block in addition to the intra prediction.

Although the current block and the corresponding block are exemplified as the chroma block and the corresponding luma block, the present disclosure is not limited thereto. For example, the current block may be a luma block and the corresponding block may be a corresponding chroma block. Alternatively, the current block is a first color component block and the corresponding bock may be a second color component block. In this case, the first color component may be, for example, one of a luma component and a plurality of chroma components, and the second color component may be a color component different from the first color component. For example, the first color component block may be a first chroma component block, and the second color component block may be a second chroma component block.

Referring to FIG. 20 again, when the intra prediction mode of the corresponding block is available in step S2020, the intra prediction mode of the corresponding block may be obtained (S2030), and the intra prediction mode of the current block may be derived based on the intra prediction mode of the corresponding block (S2040). In step S2020, when the intra prediction mode of the corresponding block is not available, a default intra prediction mode may be determined (S2050), and the intra prediction mode of the current block may be derived based on the default intra prediction mode (S2060). As the default intra prediction mode of step S2050, a DC mode or a planar mode may be used. However, the present disclosure is not limited thereto and, as the default intra prediction mode, a predefined intra prediction mode or an intra prediction mode signaled through a bitstream may be used.

According to the present disclosure, when the intra prediction mode of the current block is derived from the intra prediction mode of the corresponding block, if the intra prediction mode of the corresponding block is not present, since the intra prediction mode of the current block may be derived based on the default intra prediction mode, it is possible to efficiently perform intra prediction with respect to the current block even if the intra prediction mode of the corresponding block is not present.

Figure 21:
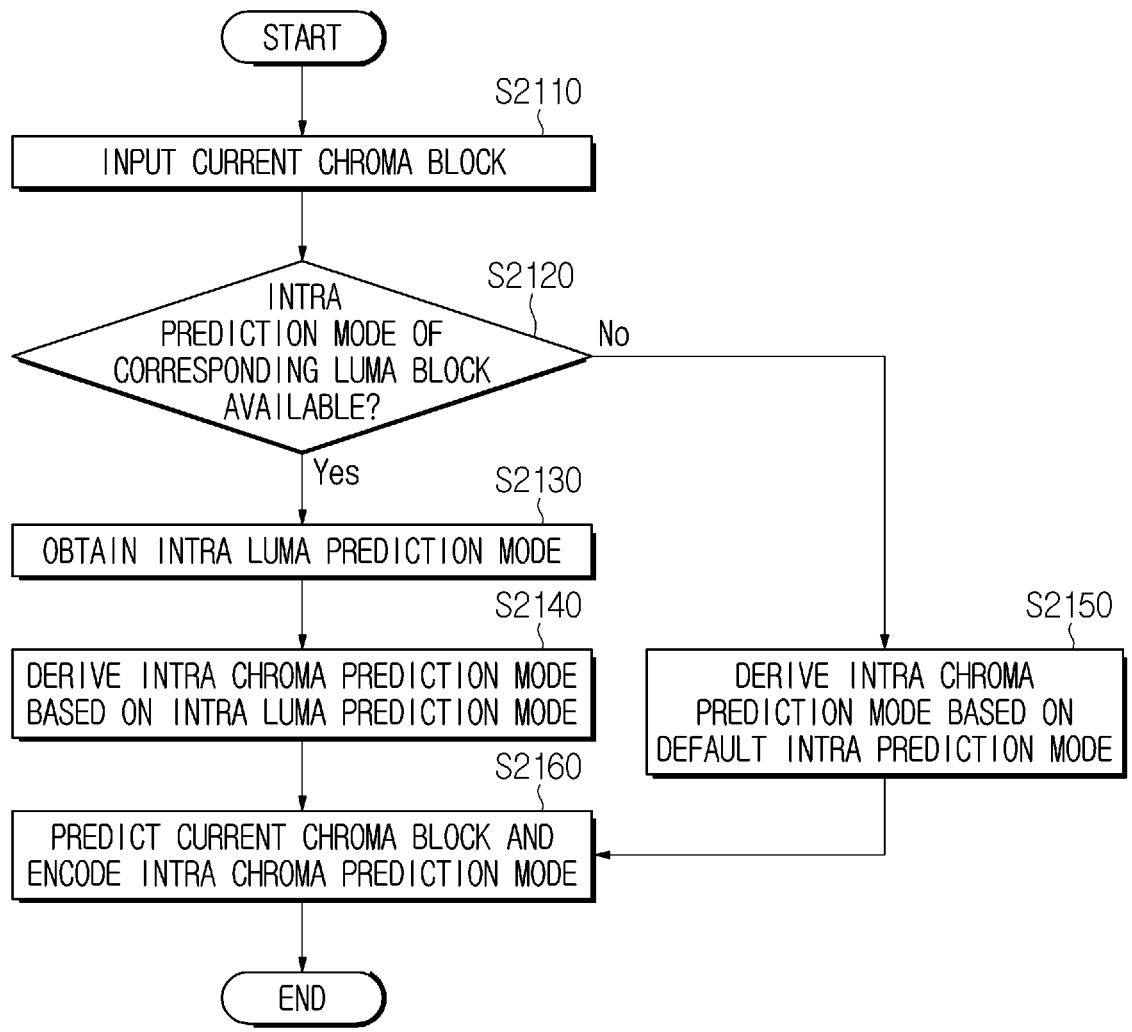
FIG. 21 is a flowchart illustrating another embodiment of the present disclosure of deriving an intra prediction mode of a chroma block based on a luma block and encoding the chroma block.

FIG. 21 is a flowchart illustrating another embodiment of the present disclosure of deriving an intra prediction mode of a chroma block based on a corresponding luma block and encoding the chroma block.

FIG. 21 relates to operation of an image encoding apparatus corresponding to the embodiment described with reference to FIG. 17.

Referring to FIG. 21, first, a current chroma block is input (S2110). In order to perform intra prediction with respect to the current chroma block, the image encoding apparatus may determine the intra prediction mode of the current chroma block. The image encoding apparatus may perform intra prediction with respect to all or at least some of the intra prediction modes applicable to the current chroma block and determine an optimal mode as the intra prediction mode of the current chroma block. Accordingly, the image encoding apparatus needs to determine whether to apply a DM to the current chroma block. To this end, it is necessary to obtain the intra prediction mode of a corresponding luma block. However, since the intra prediction mode of the corresponding luma block may not be available, the image encoding apparatus may determine whether the intra luma prediction mode of the corresponding luma block is available (S2120). Determination of step S2120 is substantially equal to determination of step S1720 and thus a repeated description will be omitted. Alternatively, as described above, step S2120 may include at least one of determination of the type of a slice/tile group including the current block, determination of the tree structure of the current block or determination of whether IBC or a third prediction mode is allowed for the current block in addition to intra prediction.

In step S2120, upon determining that the intra luma prediction mode is available, the image encoding apparatus may obtain the intra luma prediction mode from a predetermined position of a corresponding luma block (S2130), and derive the intra prediction mode of the current chroma block including the intra luma prediction mode (S2140). For example, the image encoding apparatus may select one intra prediction mode from among one or more intra prediction modes applicable to the current chroma block including the intra luma prediction mode by comparison of the RD-cost. However, a method of selecting the intra prediction mode of the current chroma block by the image encoding apparatus is not limited to the above-described example. When the intra prediction mode of the current chroma block is derived, intra prediction may be performed with respect to the current chroma block based on the derived intra prediction mode, and a prediction block may be generated. In addition, the intra prediction mode of the current chroma block may be encoded based on the intra luma prediction mode (S2160). For example, when the intra luma prediction mode is determined to be the intra prediction mode of the current chroma block, the intra chroma prediction mode information may be encoded into a value indicating the DM.

When the intra luma prediction mode of the corresponding luma block is not available in step S2120, instead of the intra luma prediction mode, the intra prediction mode of the current chroma block may be derived using a default intra prediction mode (S2150). When the intra prediction mode of the current chroma block is derived, intra prediction may be performed with respect to the current chroma block based on the derived intra prediction mode, and a prediction block may be generated. In addition, the intra prediction mode of the current chroma block may be encoded based on the default intra prediction mode (S2160).

In step S2150, a DC mode or a planar mode may be used as the default intra prediction mode. However, the present disclosure is not limited thereto, a predefined intra prediction mode may be used as a default intra prediction mode, or the default intra prediction mode may be determined by the image encoding apparatus and information on the determined default intra prediction mode may be signaled through a bitstream.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 22:
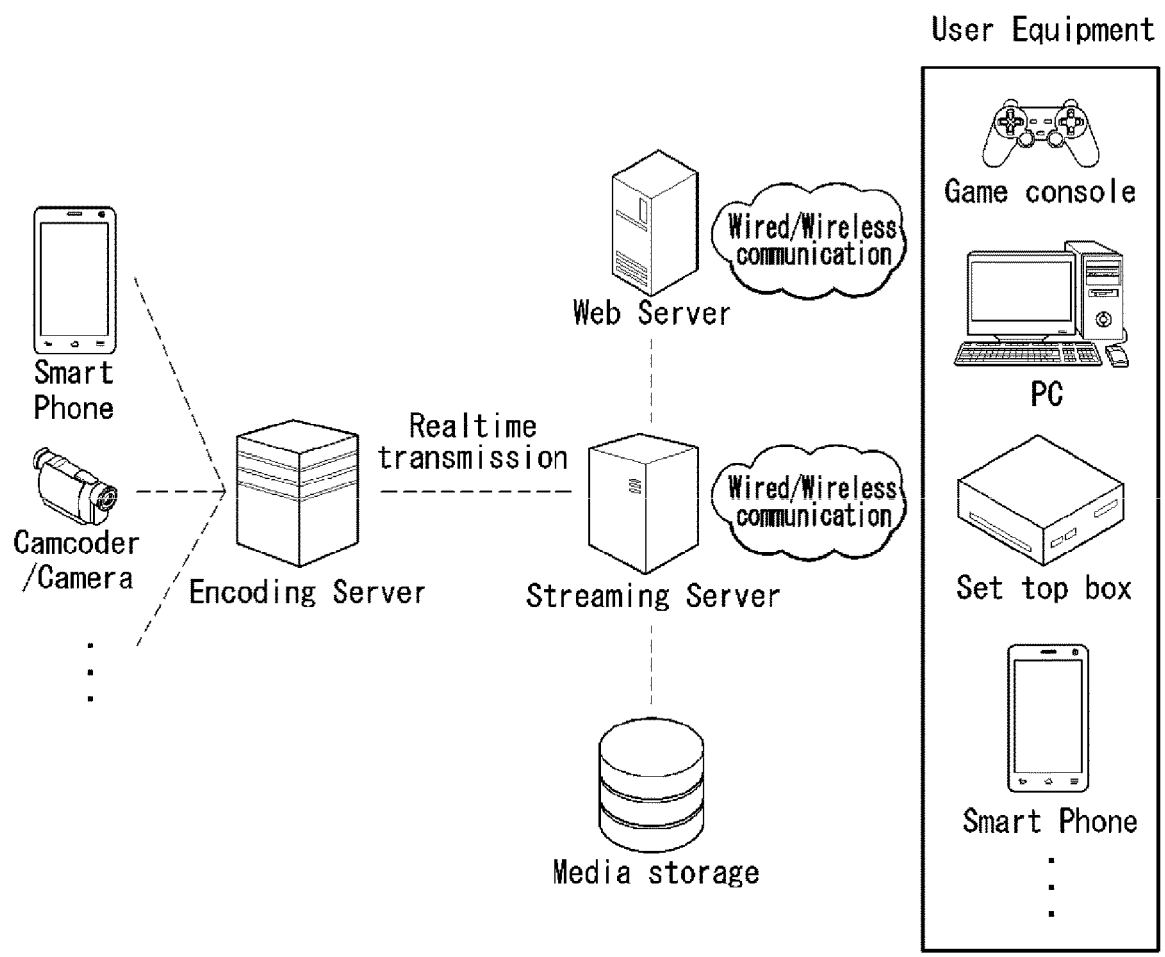
FIG. 22 is a view showing a content streaming system, to which an embodiment of the present disclosure is applicable.

FIG. 22 is a view showing a content streaming system, to which an embodiment of the present disclosure is applicable.

As shown in FIG. 22, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:
1. An image decoding method performed by an image decoding apparatus, the image decoding method comprising:

determining whether to apply intra prediction to a current chroma block based on information on prediction of the current chroma block;
deriving an intra prediction mode of the current chroma block based on intra prediction being applied to the current chroma block; and
generating a prediction block of the current chroma block, by performing intra prediction based on the intra prediction mode of the current chroma block,
wherein the intra prediction mode of the current chroma block is derived based on an intra prediction mode of the corresponding luma block and intra chroma prediction mode information of the current chroma block,
wherein, based on a corresponding luma block not being intra predicted, the intra prediction mode of the current chroma block is derived based on a default intra prediction mode,
wherein the deriving the intra prediction mode of the current chroma block comprises determining a prediction method at a predetermined position of the corresponding luma block,
wherein, based on the prediction method at the predetermined position of the corresponding luma block being an intra block copy (IBC) prediction, the intra prediction mode of the current chroma block is derived based on the default intra prediction mode, and
wherein the default intra prediction mode is a DC mode.

2. The image decoding method of claim 1,
wherein, based on the prediction method at the predetermined position of the corresponding luma block being an intra prediction, the intra prediction mode of the current chroma block is derived based on an intra prediction mode at the predetermined position of the corresponding luma block, and
wherein, based on the prediction method at the predetermined position of the corresponding luma block not being an intra prediction, the intra prediction mode of the current chroma block is derived based on the default intra prediction mode.

3. The image decoding method of claim 1, wherein the predetermined position is a center position of the corresponding luma block.

4. The image decoding method of claim 1, wherein a tree structure of the current chroma block is a dual tree (DUAL_TREE) structure.

5. The image decoding method of claim 1,
wherein, based on the intra chroma prediction mode information of the current chroma block indicating a direct mode (DM) and the intra prediction mode of the corresponding luma block being present, the intra prediction mode of the current chroma block is derived as the intra prediction mode of the corresponding luma block, and
wherein, based on the intra chroma prediction mode information of the current chroma block indicating a DM and the intra prediction mode of the corresponding luma block not being present, the intra prediction mode of the current chroma block is derived as the default intra prediction mode.

6. An image encoding method performed by an image encoding apparatus, the image encoding method comprising:
determining whether to apply intra prediction to a current chroma block;
deriving an intra prediction mode of the current chroma block based on intra prediction being applied to the current chroma block;
generating a prediction block of the current chroma block, by performing intra prediction based on the intra prediction mode of the current chroma block; and
encoding the intra prediction mode of the current chroma block based on an intra prediction mode of a corresponding luma block,
wherein the intra prediction mode of the current chroma block is derived based on the intra prediction mode of the corresponding luma block and intra chroma prediction mode information of the current chroma block,
wherein, based on the corresponding luma block not being intra predicted, the intra prediction mode of the current chroma block is derived based on a default intra prediction mode,
wherein the deriving the intra prediction mode of the current chroma block comprises determining a prediction method at a predetermined position of the corresponding luma block,
wherein, based on the prediction method at the predetermined position of the corresponding luma block being an intra block copy (IBC) prediction, the intra prediction mode of the current chroma block is derived based on the default intra prediction mode, and
wherein the default intra prediction mode is a DC mode.

7. The image encoding method of claim 6,
wherein, based on the prediction method at the predetermined position of the corresponding luma block being an intra prediction, the intra prediction mode of the current chroma block is derived based on an intra prediction mode at the predetermined position of the corresponding luma block, and
wherein, based on the prediction method at the predetermined position of the corresponding luma block not being an intra prediction, the intra prediction mode of the current chroma block is derived based on the default intra prediction mode.

8. The image encoding method of claim 6, wherein the predetermined position is a center position of the corresponding luma block.

9. A non-transitory computer-readable medium storing a bitstream generated by an image encoding method, the image encoding method comprising:
determining whether to apply intra prediction to a current chroma block;
deriving an intra prediction mode of the current chroma block based on intra prediction being applied to the current chroma block;
generating a prediction block of the current chroma block, by performing intra prediction based on the intra prediction mode of the current chroma block; and
encoding the intra prediction mode of the current chroma block based on an intra prediction mode of a corresponding luma block,
wherein the intra prediction mode of the current chroma block is derived based on the intra prediction mode of the corresponding luma block and intra chroma prediction mode information of the current chroma block,
wherein, based on the corresponding luma block not being intra predicted, the intra prediction mode of the current chroma block is derived based on a default intra prediction mode,
wherein the deriving the intra prediction mode of the current chroma block comprises determining a prediction method at a predetermined position of the corresponding luma block, and
wherein, based on the prediction method at the predetermined position of the corresponding luma block being an intra block copy (IBC) prediction, the intra prediction mode of the current chroma block is derived based on the default intra prediction mode, wherein the default intra prediction mode is a DC mode.

* * * * *